(12) United States Patent
Park et al.

(10) Patent No.: US 12,468,351 B2
(45) Date of Patent: Nov. 11, 2025

(54) ELECTRONIC DEVICE ADJUSTING SOUND SIGNAL AND METHOD FOR CONTROLLING THE ELECTRONIC DEVICE

(71) Applicant: SAMSUNG ELECTRONICS CO., LTD., Suwon-si (KR)

(72) Inventors: Hyein Park, Suwon-si (KR); Deokhyeong Yoo, Suwon-si (KR); Sangheon Kim, Suwon-si (KR); Mira Seo, Suwon-si (KR); Jungyeol An, Suwon-si (KR); Seungyoon Heo, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 17/885,395

(22) Filed: Aug. 10, 2022

(65) Prior Publication Data

US 2023/0049857 A1 Feb. 16, 2023

Related U.S. Application Data

(63) Continuation of application No. PCT/KR2022/011845, filed on Aug. 9, 2022.

(30) Foreign Application Priority Data

Aug. 10, 2021 (KR) .................. 10-2021-0105667

(51) Int. Cl.
*G06F 1/16* (2006.01)
*H04R 3/04* (2006.01)

(52) U.S. Cl.
CPC .......... *G06F 1/1677* (2013.01); *G06F 1/1618* (2013.01); *G06F 1/1652* (2013.01); *H04R 3/04* (2013.01); *H04R 2430/01* (2013.01)

(58) Field of Classification Search
CPC .... G06F 1/1677; G06F 1/1618; G06F 1/1652; H04R 3/04; H04R 2430/01; H04M 9/08; G10L 21/0208; G10L 2021/02082
See application file for complete search history.

(56) References Cited

U.S. PATENT DOCUMENTS 9,894,439 B1 * 2/2018 Peeler .................. H04R 3/005
2009/0190769 A1 7/2009 Wang et al.
(Continued)

FOREIGN PATENT DOCUMENTS

CN 107566660 A 1/2018
CN 109714485 5/2019
(Continued)

OTHER PUBLICATIONS

International Search Report dated Nov. 11, 2022 issued in International Application No. PCT/KR2022/011845 with partial English translation (6 pages).
(Continued)

*Primary Examiner* — Mong-Shune Chung
(74) *Attorney, Agent, or Firm* — Nixon & Vanderhye P.C.

(57) ABSTRACT

According to an embodiment, an electronic device may comprise: a flexible display, at least one microphone, a sensor, a communication module comprising communication circuitry, and at least one processor operatively connected with the flexible display, the at least one microphone, the sensor, and the communication module. The at least one processor may be configured to: based on receiving a call signal from an external electronic device through the communication module, identify whether the call signal is a video call signal, based on the call signal being the video call signal, identify a folding state of the electronic device through the sensor, adjust a sound signal received through the at least one microphone based on the folding state, and
(Continued)

control the communication module to transmit the adjusted sound signal to the external electronic device.

20 Claims, 18 Drawing Sheets

(56) References Cited

U.S. PATENT DOCUMENTS

| | | | | |
|---|---|---|---|---|
| 2012/0276961 | A1* | 11/2012 | Momma | G10L 21/0208 |
| | | | | 704/227 |
| 2013/0321264 | A1* | 12/2013 | Park | G06F 3/0482 |
| | | | | 345/156 |
| 2016/0150207 | A1* | 5/2016 | Zheng | H04S 1/00 |
| | | | | 386/227 |
| 2017/0012591 | A1* | 1/2017 | Rider | H04R 3/00 |
| 2017/0052566 | A1* | 2/2017 | Ka | G09G 3/035 |
| 2020/0264666 | A1 | 8/2020 | Itou | |
| 2020/0365168 | A1 | 11/2020 | Cho et al. | |
| 2021/0004199 | A1* | 1/2021 | Davis | G06F 3/165 |
| 2021/0058503 | A1 | 2/2021 | Lee et al. | |
| 2021/0365165 | A1 | 11/2021 | Chen | |
| 2021/0409644 | A1* | 12/2021 | VanBlon | H04N 7/144 |
| 2022/0057980 | A1* | 2/2022 | Adoni | G06F 1/1652 |
| 2022/0261093 | A1* | 8/2022 | Zhang | G06F 1/1652 |
| 2022/0276680 | A1 | 9/2022 | Liang | |
| 2022/0353361 | A1 | 11/2022 | Kim et al. | |

FOREIGN PATENT DOCUMENTS

| | | | | |
|---|---|---|---|---|
| CN | 110381282 | | 10/2019 | |
| CN | 112261201 | A | 1/2021 | |
| CN | 112492100 | A | 3/2021 | |
| CN | 112669866 | A * | 4/2021 | |
| CN | 107910013 | B * | 9/2021 | G10L 21/0208 |
| KR | 10-2010-0115783 | | 10/2010 | |
| KR | 10-2019-0097473 | A | 8/2019 | |
| KR | 2020/177638 | A1 | 9/2020 | |
| KR | 10-2021-0022302 | A | 3/2021 | |
| KR | 10-2021-0083059 | A | 7/2021 | |
| KR | 10-2021-0086267 | A | 7/2021 | |

OTHER PUBLICATIONS

Written Opinion dated Nov. 11, 2022 issued in International Application No. PCT/KR2022/011845 (4 pages).
Korean Office Action dated Sep. 19, 2025 for KR Application No. 10-2021-0105667.

* cited by examiner

ELECTRONIC DEVICE ADJUSTING SOUND SIGNAL AND METHOD FOR CONTROLLING THE ELECTRONIC DEVICE

CROSS-REFERENCE TO RELATED APPLICATIONS

This application is a continuation of International Application No. PCT/KR2022/011845 designating the United States, filed on Aug. 9, 2022, in the Korean Intellectual Property Receiving Office and claiming priority to Korean Patent Application No. 10-2021-0105667, filed on Aug. 10, 2021, in the Korean Intellectual Property Office, the disclosures of which are incorporated by reference herein in their entireties.

BACKGROUND

Field

The disclosure relates to an electronic device adjusting a sound signal and a method for controlling the same.

Description of Related Art

As the demand for mobile communication increases, or as the degree of integration of electronic devices increases, the portability of electronic devices such as mobile communication terminals may be increased, and better convenience may be provided in use of multimedia functions.

As electronic devices are used in various places, there is an increasing need for technology for performing audio-related functions without disturbance from ambient noise even in noisy places, such as in airplanes, subways, or downtown areas.

There have been thus used technology that inputs ambient noise through a microphone included in an electronic device or external earphone and causes destructive interference, through a noise canceling circuit, to cancel out the input noise to thereby cut off the noise, such as noise suppression (NS), active noise control (ANC), noise canceling, or active noise reduction (ANR).

The conventional noise canceling technology determines that among the sound signals received through several microphones, the largest sound signal is the speaker's sound signal while the rest are noise, and removes the noise signals.

Thus, if the speaker's voice is larger than the ambient noise, an issue arises where the speaker's voice is mistaken as noise and removed.

Further, if various form factors may be implemented, such as the foldable electronic device or slidable electronic device, the position of the microphone is changed according to the form factor of the electronic device, so that dynamic adjusting of audio signals is required depending on the form factor of the electronic device.

SUMMARY

Embodiments of the disclosure provide an electronic device for dynamically adjusting audio signals depending on the form factor of the electronic device and a method for controlling the electronic device.

According to various example embodiments, an electronic device may comprise: a flexible display, at least one microphone, a sensor, a communication module comprising communication circuitry, and at least one processor operatively connected with the flexible display, the at least one microphone, the sensor, and the communication module. The at least one processor may be configured to: upon receiving a call signal from an external electronic device through the communication module, identify whether the call signal is a video call signal, based on the call signal being the video call signal, identify a folding state of the electronic device through the sensor, adjust a sound signal received through the at least one microphone based on the folding state, and control the communication module to transmit the adjusted sound signal to the external electronic device through the communication module.

According to various example embodiments, a method for controlling an electronic device may comprise: upon receiving a call signal from an external electronic device through a communication module, identifying whether the call signal is a video call signal, based on the call signal being the video call signal, identifying a folding state of the electronic device through a sensor, adjusting a sound signal received through at least one microphone based on the folding state, and transmitting the adjusted sound signal to the external electronic device through the communication module.

According to various example embodiments of the disclosure, the electronic device may increase the sound signal received from the front of the electronic device while reducing the other sound signals when a video call is conducted, thereby enhancing the noise canceling effect.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
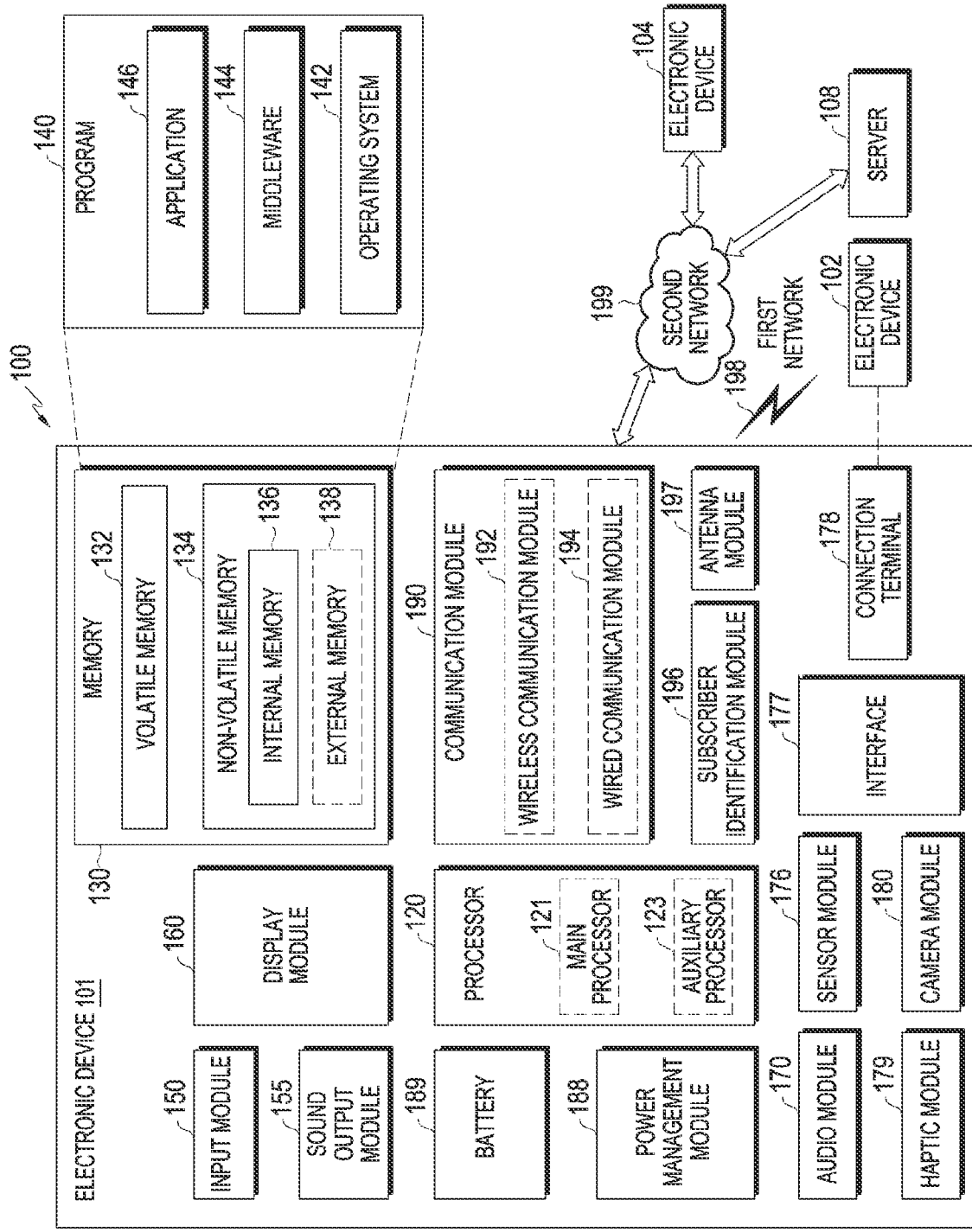
FIG. 1 is a block diagram illustrating an example electronic device in a network environment according to various embodiments.

FIG. 1 is a block diagram illustrating an example electronic device 100 in a network environment 1000 according to various embodiments. Referring to FIG. 1, the electronic device 100 in the network environment 100 may communicate with at least one of an electronic device 1020 via a first network 198 (e.g., a short-range wireless communication network), or an electronic device 104 or a server 108 via a second network 199 (e.g., a long-range wireless communication network). According to an embodiment, the electronic device 100 may communicate with the electronic device 104 via the server 108. According to an embodiment, the electronic device 100 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 100, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 100 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 100 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 100, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 100 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 100. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 100, from the outside (e.g., a user) of the electronic device 100. The input module 150 may include, for example, a microphone, a mouse, a keyboard, keys (e.g., buttons), or a digital pen (e.g., a stylus pen).

The sound output module 155 may output sound signals to the outside of the electronic device 100. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 100.

The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 1020) directly (e.g., wiredly) or wirelessly coupled with the electronic device 100.

The sensor module 176 may detect an operational state (e.g., power or temperature) of the electronic device 100 or an environmental state (e.g., a state of a user) external to the electronic device 100, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 100 to be coupled with the external electronic device (e.g., the electronic device 1020) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 100 may be physically connected with the external electronic device (e.g., the electronic device 1020). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 100. According to an embodiment, the power management module 188 may be implemented as at least part of, for example, a power management integrated circuit (PMIC).

The battery 189 may supply power to at least one component of the electronic device 100. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 100 and the external electronic device (e.g., the electronic device 1020, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 100 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 100, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 100 and the external electronic device 104 via the server 108 coupled with the second network 199. The external electronic devices 102 or 104 each may be a device of the same or a different type from the electronic device 100. According to an embodiment, all or some of operations to be executed at the electronic device 100 may be executed at one or more of the external electronic devices 102, 104, or 108. For example, if the electronic device 100 should perform a function or a service automatically, or in response to a request from a user or another device, the electronic device 100, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 100. The electronic device 100 may provide the outcome, with or without further processing of the outcome, as at least part of a reply to the request. To that end, a cloud computing, distributed computing, mobile edge computing (MEC), or client-server computing technology may be used, for example. The electronic device 100 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 100 may be applied to intelligent services (e.g., smart home, smart city, smart car, or health-care) based on 5G communication technology or IoT-related technology.

Figure 2:
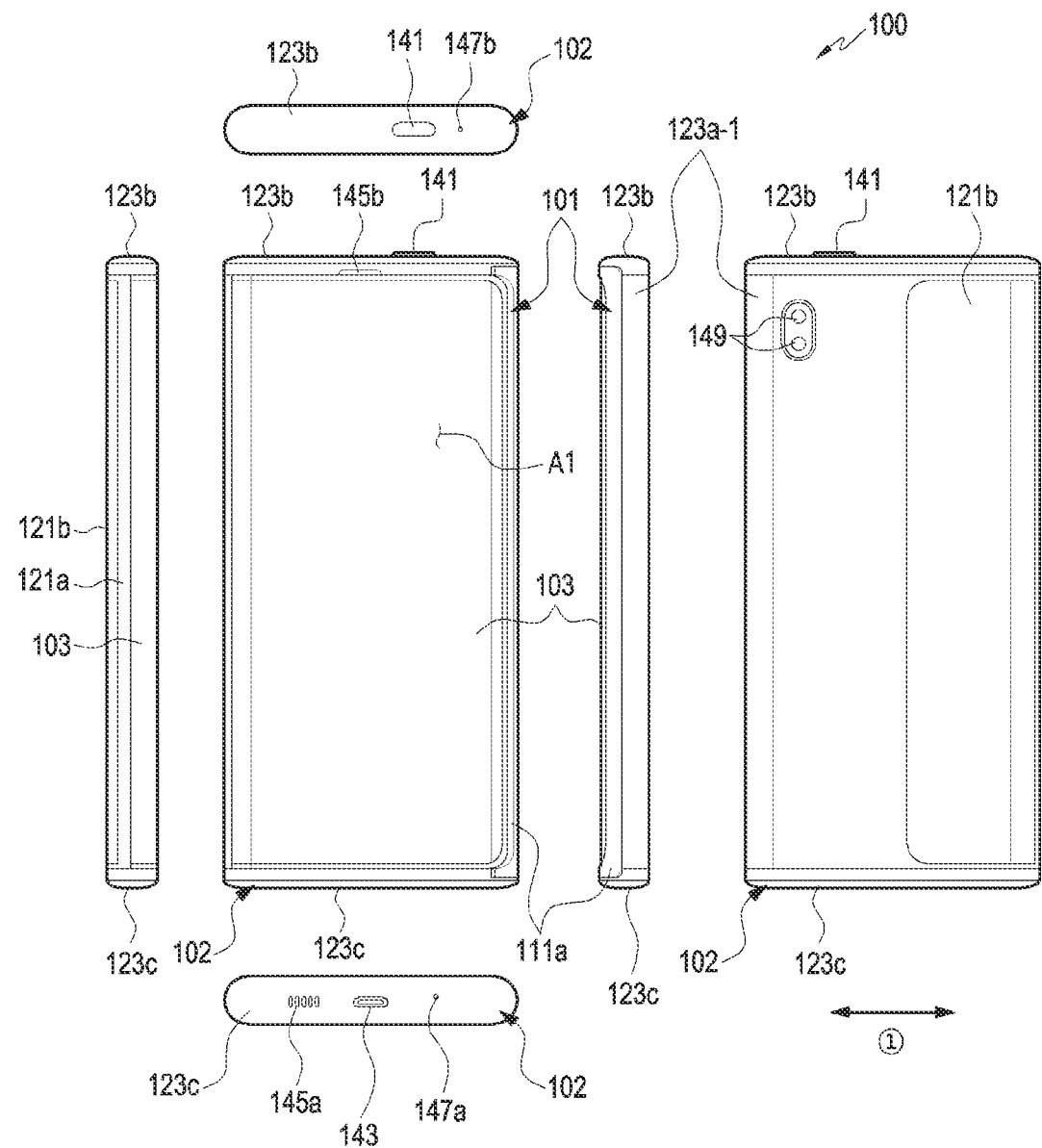
FIG. 2 is a diagram illustrating an electronic device, in which a portion of a flexible display is received in a housing according to various embodiments.

FIG. 2 is a diagram illustrating an electronic device, wherein a portion (e.g., a second area A2) of a flexible display 103 is received in a second structure 102 (e.g., housing) according to various embodiments.

Figure 3:
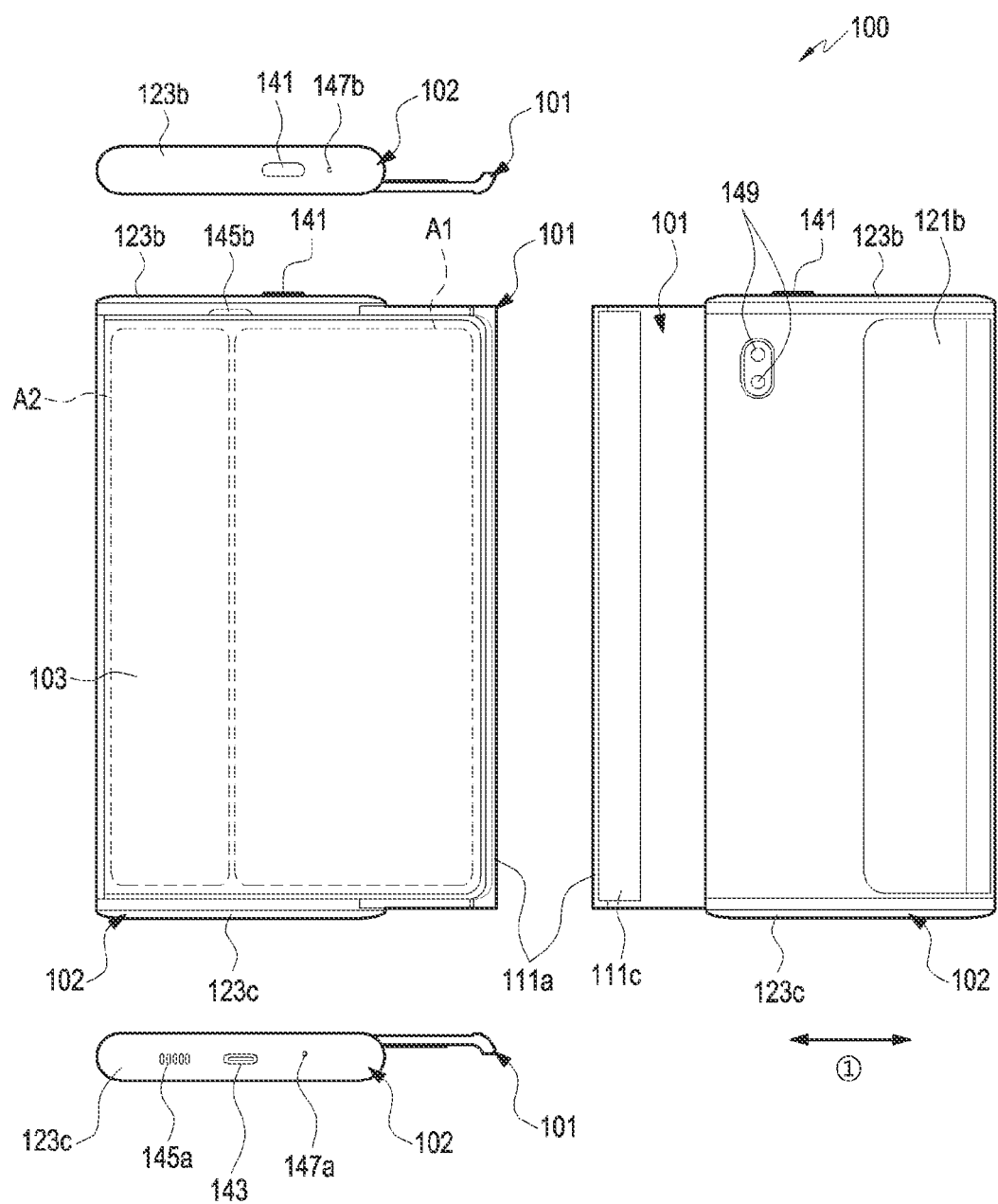
FIG. 3 is a diagram illustrating an electronic device, in which most of a flexible display is exposed to the outside of a housing according to various embodiments.

FIG. 3 is a diagram illustrating an electronic device, wherein most of a flexible display 103 is exposed to the outside of a second structure 102 (e.g., housing) according to various embodiments.

The state shown in FIG. 2 may be defined as a first structure 101 being closed with respect to a second structure 102, and the state shown in FIG. 3 may be defined as the first structure 101 being open with respect to the second structure 102. According to an embodiment, the "closed state" or "open state" may be defined as a closed or open state of the electronic device.

Referring to FIGS. 2 and 3, an electronic device 100 may include a first structure 101 and a second structure 102 disposed to be movable in the first structure 101. According to an embodiment, the electronic device 100 may be interpreted as having a structure in which the first structure 101 is slidably disposed on the second structure 102. According to an embodiment, the first structure 101 may be disposed to perform reciprocating motion by a predetermined distance in a predetermined direction with respect to the second structure 102, for example, a direction indicated by an arrow ①.

According to an embodiment, the first structure 101 may be referred to as, for example, a first housing, a slide unit, or a slide housing, and may be disposed to reciprocate on the second structure 102. According to an embodiment, the second structure 102 may be referred to as, for example, a second housing, a main part, or a main housing, and may receive various electric or electronic components such as a main circuit board or a battery. A portion (e.g., the first area A1) of the display 103 may be seated on the first structure 101. According to an embodiment, another portion (e.g., the second area A2) of the display 103 may be received (e.g., slide-in) into the inside of the second structure 102 or exposed (e.g., slide-out) to the outside of the second structure 102 as the first structure 101 moves (e.g., slides) relative to the second structure 102.

According to various embodiments, the first structure 101 may include a first plate 111a (e.g., a slide plate) and may include a first surface formed with at least a portion of the first plate 111a and a second surface in the opposite direction from the first surface. According to an embodiment, the second structure 102 may include a second plate (e.g., a rear case), a first sidewall 123a extending from the second plate 121a, a second sidewall 123b extending from the first sidewall and the second plate 121a, a third sidewall 123c extending from the first sidewall 123a and the second plate 121a and positioned parallel to the second sidewall 123b, and/or a rear plate 121b (e.g., a rear window). According to an embodiment, the second sidewall 123b and the third sidewall 123c may be formed to be perpendicular to the first sidewall 123a. According to an embodiment, the second plate 121a, the first sidewall 123a, the second sidewall 123b, and the third sidewall 123c may be formed to have an opening (e.g., in the front face) to receive (or surround) at least a portion of the first structure 101. For example, the first structure 101 may be coupled to the second structure 102 in a state in which it is at least partially surrounded, and the first structure 101 may be guided by the second structure 102 to slide in a direction parallel to the first surface or the second surface, for example, direction indicated with the arrow ①. According to an embodiment, the second sidewall 123b or the third sidewall 123c may be omitted. According to an embodiment, the second plate 121a, the first sidewall 123a, the second sidewall 123b, and/or the third sidewall 123c may be formed as separate structures and may be combined or assembled. The rear plate 121b may be coupled to surround at least a portion of the second plate 121a. In some embodiments, the rear plate 121b may be formed substantially integrally with the second plate 121a. According to an embodiment, the second plate 121a or the rear plate 121b may cover at least a portion of the flexible display 103. For example, the flexible display 103 may be at least partially received inside the second structure 102, and the second plate 121a or the rear plate 121b may cover the portion of the flexible display received inside the second structure 102.

According to an embodiment, the first structure 101 may be moved in an open state or closed state with respect to the second structure 102 in a first direction (e.g., direction θ) parallel with the second plate 121a (e.g., the rear case) and the second side wall 123b to be positioned a first distance away from the first side wall 123a in the closed state and be positioned a second distance away from the first side wall 123a in the open state, wherein the second distance is larger than the first distance. In some embodiments, when in the closed state, the first structure 101 may be positioned to surround a portion of the first sidewall 123a.

According to various embodiments, the electronic device 100 may include a display 103, a key input device 141, a connector hole 143, audio modules 145a, 145b, 147a, and 147b, or a camera module 149. Although not shown, the electronic device 100 may further include an indicator (e.g., a light emitting diode (LED) device) or various sensor modules.

According to an embodiment, the display 103 may include a first area A1 and a second area A2. In an embodiment, the first area A1 may extend substantially across at least a portion of the first surface and may be disposed on the first surface. The second area A2 may extend from the first area A1 and be inserted or received into the inside of the second structure 102 (e.g., housing) or be exposed to the outside of the structure 102 as the first structure 101 slides. As is described below, the second area A2 may be moved while being substantially guided by a roller mounted on the second structure 102 and may thus be received into the inside of or exposed to the outside of the second structure 102. For example, while the first structure 101 slides, a portion of the second area A2 may be deformed into a curved shape in a position corresponding to the roller.

According to various embodiments, when viewed from the top of the first plate 111a (e.g., slide plate), when the first structure 101 moves from the closed state to the open state, the second area A2 may be gradually exposed to the outside of the second structure 102 to be substantially coplanar with the first area A1. The display 103 may be disposed to be coupled with, or adjacent, a touch detecting circuit, a pressure sensor capable of measuring the strength (pressure) of touches, and/or a digitizer for detecting a magnetic field-type stylus pen. In an embodiment, the second area A2 may be at least partially received inside the second structure 102, and a portion of the second area A2 may be exposed to the outside even in the state shown in FIG. 1 (e.g., the closed state). In some embodiments, irrespective of the closed state or the open state, the exposed portion of the second area A2 may be positioned on the roller and, in a position corresponding to the roller, a portion of the second area A2 may maintain the curved shape. The key input device 141 may be disposed on the second sidewall 123b or the third sidewall 123c of the second structure 102. Depending on the appearance and the state of use, the electronic device 100 may be designed to omit the illustrated key input device 141 or to include additional key input device(s). According to an embodiment, the electronic device 100 may include a key input device (not shown), e.g., a home key button or a touchpad disposed around the home key button. According to an embodiment, at least a portion of the key input device 141 may be positioned on an area of the first structure 101.

According to various embodiments, the connector hole 143 may be omitted or may receive a connector (e.g., a universal serial bus (USB) connector) for transmitting and receiving power and/or data with an external electronic device. Although not shown, the electronic device 100 may include a plurality of connector holes 143, and some of the plurality of connector holes 143 may function as connector holes for transmitting/receiving audio signals with an external electronic device. In the illustrated embodiment, the connector hole 143 is disposed on the third side wall 123c, but the disclosure is not limited thereto. For example, the connector hole 143 or a connector hole not shown may be disposed on the first side wall 123a or the second sidewall 123b.

According to various embodiments, the audio modules 145a, 145b, 147a, and 147b may include speaker holes 145a and 145b or microphone holes 147a and 147b. One of the speaker holes 145a and 145b may be provided as a receiver hole for voice calls, and the other may be provided as an external speaker hole. The microphone holes 147a and 147b may have a microphone inside to obtain external sounds. According to an embodiment, there may be a plurality of microphones to be able to detect the direction of a sound. In some embodiments, the speaker holes 145a and 145b and the microphone holes 147a and 147b may be implemented as one hole, or a speaker may be included without the speaker holes 145a and 145b (e.g., a piezo speaker). According to, the speaker hole indicated by the reference number "145b" may be disposed in the first structure 101 and used as a receiver hole for voice calls, and the speaker hole indicated by the reference number "145a" (e.g., an external speaker hole) or the microphone holes 147a and 147b may be disposed in the second structure 102 (e.g., one of the side surfaces 123a, 123b, and 123c).

The camera module 149 may be provided on the second structure 102 and may capture a subject in a direction opposite to the first area A1 of the display 103. The electronic device 100 may include a plurality of camera modules 149. For example, the electronic device 100 may include a wide-angle camera, a telephoto camera, or a close-up camera, and according to an embodiment, by including an infrared projector and/or an infrared receiver, the electronic device 100 may measure the distance to the subject. The camera module 149 may include one or more lenses, an image sensor, and/or an image signal processor. Although not shown, the electronic device 100 may further include a camera module (e.g., a front camera) that captures the subject in a direction opposite to the first area A1 of the display 103. For example, the front camera may be disposed around the first area A1 or in an area overlapping the display 103 and, when disposed in the area overlapping the display 103, the front camera may capture the subject via the display 103.

According to various embodiments, an indicator (not shown) of the electronic device 100 may be disposed on the first structure 101 or the second structure 102, and the indicator may include a light emitting diode to provide state information about the electronic device 100 as a visual signal. The sensor module (not shown) of the electronic device 100 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to an embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
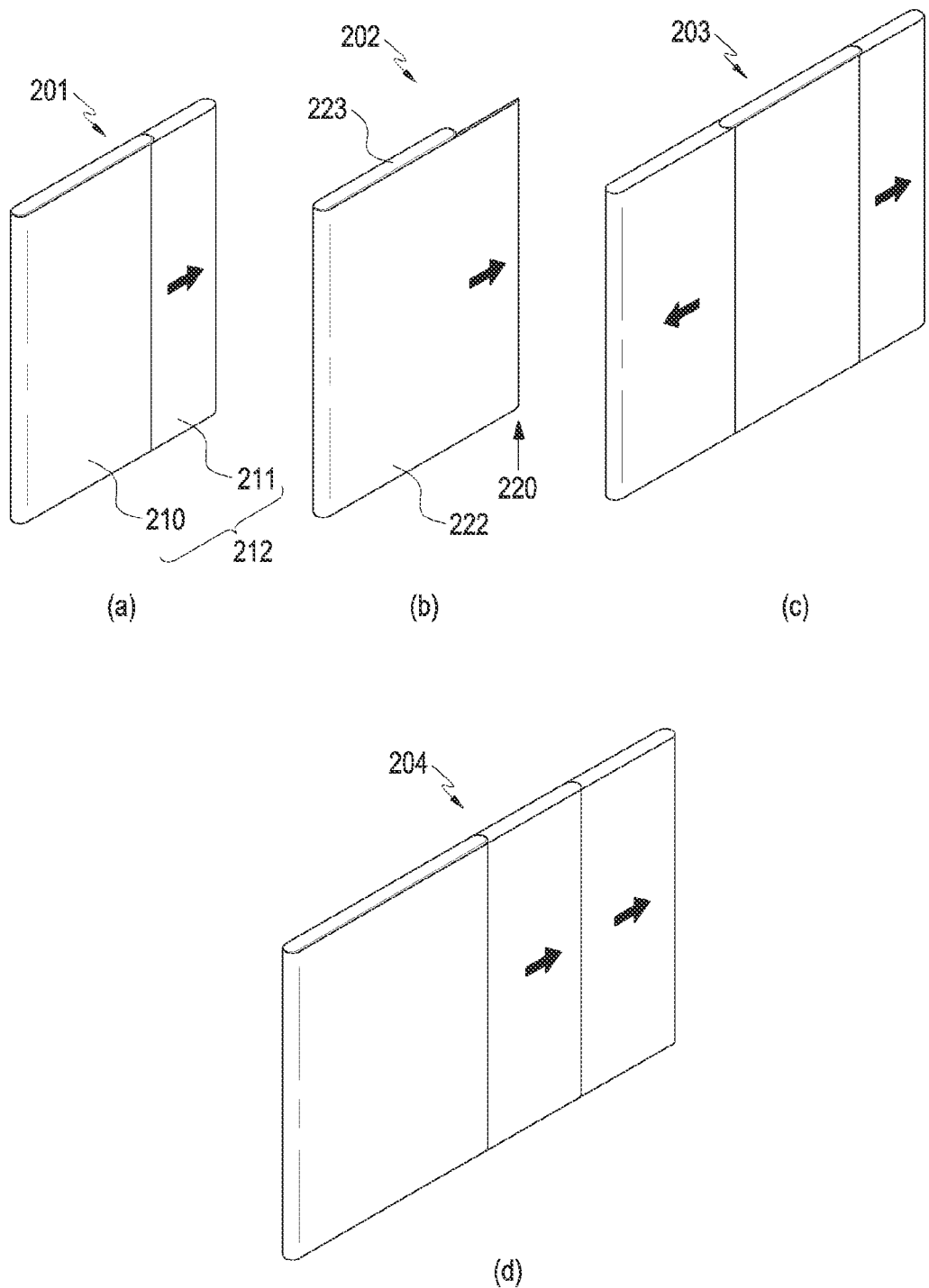
FIG. 4 is a diagram illustrating a type of a slidable electronic device according to various embodiments.

FIG. 4 is a diagram illustrating a type of a slidable electronic device according to various embodiments. According to various embodiments, an electronic device 201, 202, 203, or 204 of FIG. 4 (e.g., the electronic device 100 of FIG. 1) may include a housing and a display (e.g., the display module 160 of FIG. 1) and at least one processor (e.g., the processor 120 of FIG. 1) operably connected with the display.

According to various embodiments, at least a portion of the display may be exposed (e.g., visible) to the outside through the housing. According to various embodiments, the display may include one or more displays. According to various embodiments, the display may include an unbendable unfold display (e.g., a flat display or an edge display) or a flexible display (e.g., a foldable display, a rollable display, or a stretchable display). Hereinafter, the display is described as a flexible display, but the disclosure is not limited thereto, and an unfold display may be applied.

According to various embodiments, at least one processor and memory (e.g., the memory 130 of FIG. 1) capable of performing and controlling the functions of the electronic device 201, 202, 203 or 204 may be disposed inside the housing.

According to various embodiments, a state in which the exposed area of the flexible display is smallest may be referred to as a 'closed state', and a state in which the exposed area of the flexible display is largest may be referred to as an 'open state'.

According to various embodiments, referring to FIG. 4(a), at least a portion of the flexible display may be moved into or out of the housing according to a sliding operation. For example, upon receiving a sliding expand command in the closed state, a portion of the flexible display which is positioned inside the housing may be slid out of the housing so that the slidable electronic device 201 may change from the closed state to the open state. For example, the exposed portion 210 of the flexible display in the closed state of the electronic device 201 may be referred to as a first portion, and the exposed portion 210 of the flexible display in the open state of the electronic device 201 may be referred to as a second portion. For example, the second portion 212 may be the first portion plus the area 211 of the flexible display, expanded according to the sliding expansion operation. For example, the flexible display disposed on the housing of the flexible display may be in a fixed state.

According to various embodiments, upon receiving a sliding expand command in the closed state, a portion of the flexible display which is positioned outside the housing may be slid into the inside of the housing so that the slidable electronic device 201 may become the closed state. For example, the exposed portion 212 of the flexible display in the open state of the electronic device 201 may be referred to as a first portion, and the exposed portion 210 of the flexible display in the closed state of the electronic device 201 may be referred to as a second portion. For example, the exposed portion 210 of the flexible display after the portion 211 of the flexible display enters the housing according to the sliding contraction operation in the first portion may be the second portion.

According to various embodiments, referring to FIG. 4(b), the flexible display may be disposed to cover at least a portion of the front surface, one side surface, and the rear surface of the electronic device 202.

For example, in the closed state of the slidable electronic device 202, when a sliding expand command is received, the flexible display may be moved in a direction in which the edge portion 220 of the flexible display disposed on the front surface of the electronic device 202 leaves the housing of the electronic device 202. For example, the electronic device 202 may drive the roller (not shown) for moving the flexible display. As the flexible display is moved, the portion of the flexible display disposed on the rear surface 223 of the electronic device 202 may be moved to the front surface of the electronic device 202, expanding the exposed portion 222 of the flexible display. For example, the flexible display disposed on the housing of the flexible display may move. According to various embodiments, a state in which the exposed portion 222 of the flexible display is largest may be referred to as an open state.

According to various embodiments, when a sliding contract command is received in the open state of the slidable electronic device 202, the roller (not shown) may be driven so that the edge portion 220 of the flexible display, disposed on the front surface of the electronic device 202, is moved from the area where it leaves the housing, to the housing. As the roller is driven, the portion of the flexible display disposed on the front surface of the electronic device 202 may be moved to the rear surface of the electronic device 202, contracting the exposed portion of the flexible display. A state in which the exposed portion of the flexible display is smallest may be referred to as a closed state.

According to various embodiments, the flexible display of the slidable electronic device 202 may be disposed to enter the housing of the electronic device 202, rather than the rear surface of the electronic device 202, from the area surrounding one side of the electronic device 202.

Although it is illustrated that the flexible display extends to the right of the electronic device 201 or 202 in (a) and (b) of FIG. 4, the disclosure is not limited thereto. For example, the flexible display may be expanded or contracted to the right or left of the electronic device 201 or 202. As an embodiment, when the electronic device 201 or 202 is horizontally placed, the flexible display may be expanded or contracted upward or downward of the electronic device 201 or 202.

Although (a) and (b) of FIG. 4 illustrate that a longer side of the flexible display of the rectangular electronic device 201 or 202 is moved so that the flexible display is expanded or contracted, the disclosure is not limited thereto. For example, a shorter side of the flexible display of the rectangular electronic device 201 or 202 may be moved so that the flexible display may be expanded or contracted.

Although FIG. 4 illustrates that the rectangular electronic device 201 or 202 is placed vertically (e.g., the portrait mode) and the shorter side of the flexible display is moved upward or downward to expand or contract the flexible display, the disclosure is not limited thereto. For example, the rectangular electronic device 201 or 202 may be placed horizontally (e.g., the landscape mode), and the shorter side of the flexible display is moved to the left or right to expand or contract the flexible display.

Although (a) and (b) of FIG. 4 illustrate that the electronic device 201 or 202 is rectangular, the disclosure is not limited thereto. For example, the electronic device 201 or 202 may be shaped as a square. For example, the electronic device 201 or 202 allows one side of the flexible display to be moved up, down, left, or right, expanding or contracting the flexible display.

Although (a) and (b) of FIG. 4 illustrate that the flexible display is expanded or contracted only in one direction of the electronic device 201 or 202, the disclosure is not limited thereto. For example, referring to FIG. 4(c), the slidable electronic device 203 may expand or contract the flexible display in two directions.

According to various embodiments, the electronic device 203 may expand or contract the flexible display in only one or both of the two directions.

Although FIG. 4(c) illustrates that two opposite longer sides of the flexible display of the rectangular electronic device 203 are moved in two directions (e.g., left and right) to expand or contract the flexible display, the disclosure is not limited thereto. For example, two opposite shorter sides of the flexible display of the rectangular electronic device 203 may be moved in two directions (e.g., upward and downward) to expand or contract the flexible display.

Although FIG. 4(c) illustrates that the rectangular electronic device 203 is placed vertically, the electronic device 203 may also be placed horizontally. According to various embodiments, the electronic device 203 may be shaped as a square.

Although FIG. 4(c) illustrates that the flexible display is expanded or contracted to two sides, the disclosure is not limited thereto. For example, the slidable electronic device may expand or contract the flexible display in two directions, other than two opposite directions, (e.g., either the left or right direction and either the upward or downward).

For example, the two-way slidable electronic device may expand or contract the flexible display in the left and upper directions, in the left and lower directions, in the right and upper directions, or in the right and lower directions.

According to various embodiments, in the slidable electronic device, in both the two directions, a portion of the flexible display disposed inside the housing may be expanded or contracted through a sliding operation. As an embodiment, the electronic device 203 may slide a portion of the flexible display, disposed inside the housing, in one direction to expand or contract the flexible display as shown in FIG. 4(a) and may move the flexible display to the front surface or rear surface of the electronic device 203 in the other direction in a state in which the flexible display surrounds at least a portion of the front surface, one side surface, and rear surface of the electronic device as shown in FIG. 4(b), thereby expanding or contracting the flexible display. According to various embodiments, the flexible display may be expanded or contracted in three or four directions as well as in the two directions.

According to various embodiments, referring to FIG. 4(d), the slidable electronic device 204 may stepwise expand or contract the flexible display. According to various embodiments, an example in which the flexible display stepwise expands or contracts is described in greater detail below with reference to FIG. 9.

According to various embodiments, although FIGS. 2, 3 and 4 illustrate that the electronic device is a slidable electronic device, the electronic device may be a foldable electronic device as shown and described in greater detail below with reference to FIGS. 5 and 6.

Figure 5:
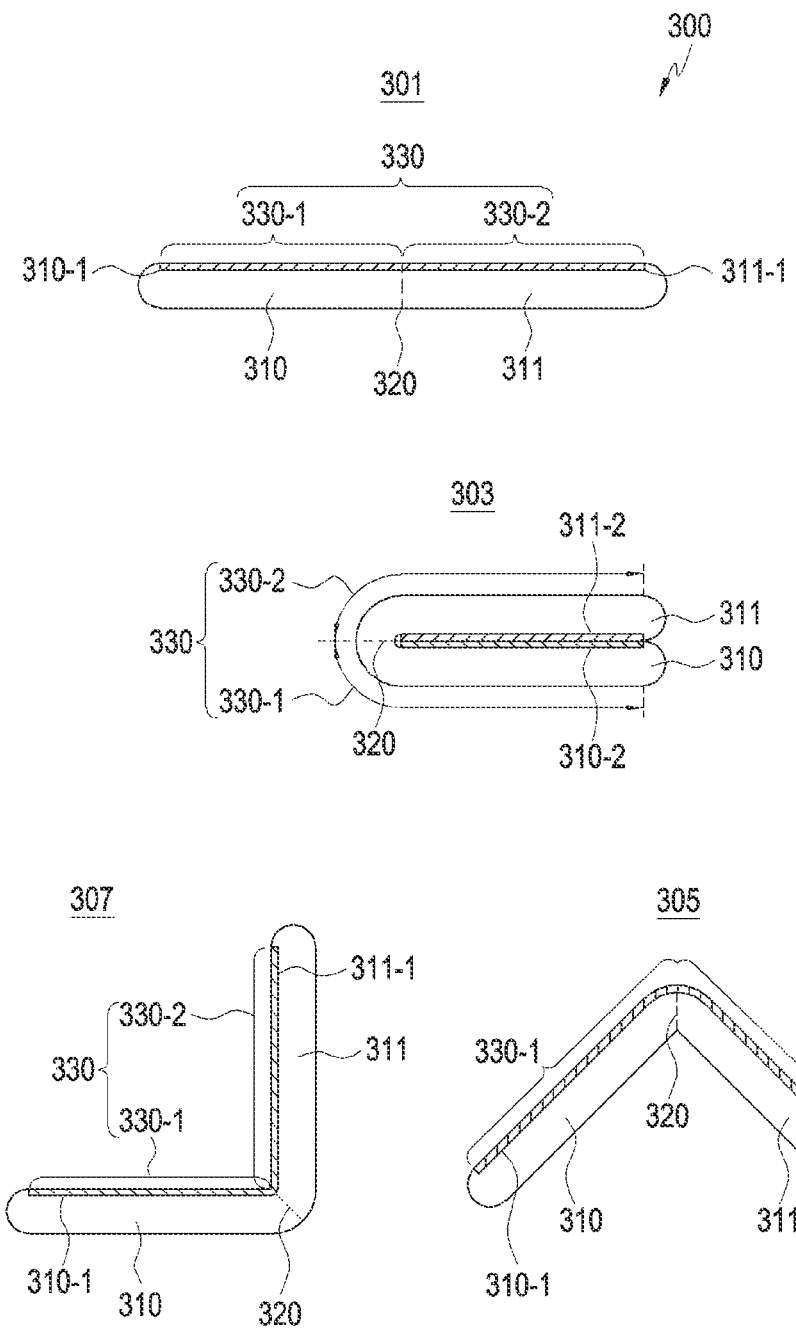
FIG. 5 is a diagram illustrating various folding states of an electronic device when the electronic device includes a two-sided flexible display according to various embodiments.

FIG. 5 is a diagram illustrating various folding states of an electronic device when the electronic device includes a two-sided flexible display according to various embodiments.

Figure 6:
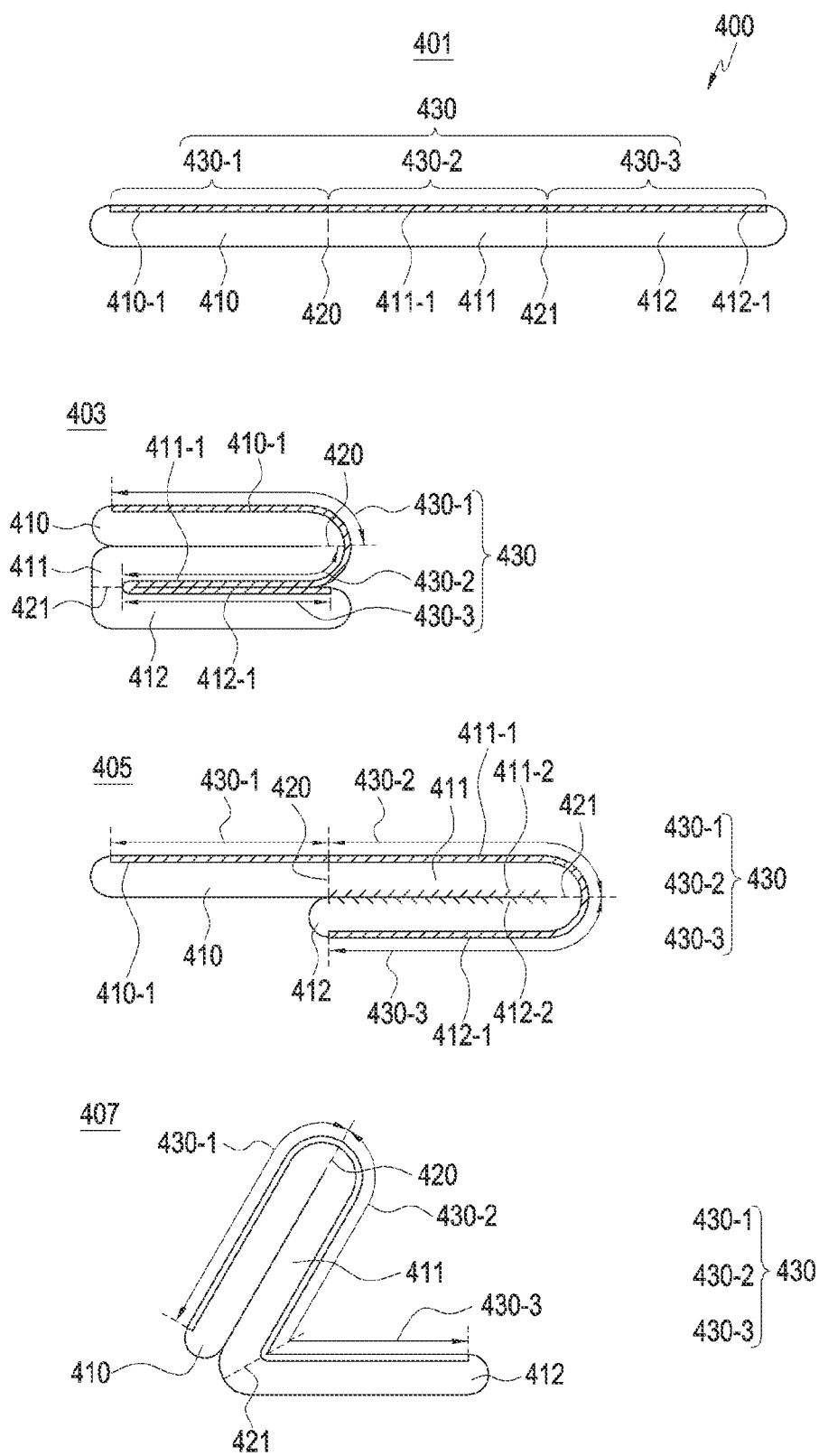
FIG. 6 is a diagram illustrating various folding states of an electronic device when the electronic device includes a three-sided flexible display according to various embodiments.

FIG. 6 is a diagram illustrating various folding states of an electronic device when the electronic device includes a three-sided flexible display according to various embodiments.

According to various embodiments, an electronic device 300, 400 may include two or more housing structures (e.g., the first housing 310 and second housing 311 of FIG. 5 or the first housing 410, second housing 411, and third housing 412 of FIG. 6) connected for each to be rotatable and a flexible display (e.g., the display 330 of FIG. 5 or the display 430 of FIG. 6). A plurality of folding states may be defined depending on at least one of whether at least one housing is folded (e.g., a shape in which at least one housing is fully folded or unfolded), the rotated state of at least one housing, the angle between the housings with respect to the hinge (e.g., the angle between the first portion of the first housing 310 and the second portion of the second housing 311 with respect to the hinge 320 of FIG. 5, the angle between the first portion of the first housing 410 and the second portion of the second housing 411 with respect to the first hinge 420 of FIG. 6, or the angle between the second portion of the second housing 411 and the third portion of the third housing 412 with respect to the second hinge 421 of FIG. 6), the direction of the electronic device 100 (e.g., the direction in which the electronic device is placed with respect to the ground), the inclined degree of the electronic device 100, or the activated portion of the flexible display (e.g., the display 330 of FIG. 5 or the display 430 of FIG. 6).

For example, various folding states of the electronic device 100 may include a form in which two areas are formed in the electronic device (e.g., the display 330 of FIG. 5) (half fold) as shown in FIG. 5 or a form in which three areas are formed in the electronic device (e.g., the display 430 of FIG. 6) (e.g., tri fold, Z fold, single open gate fold) as shown in FIG. 6. Without limited thereto, there may also be included a form in which four areas are formed in the electronic device (e.g., the display (not shown)) (e.g., double parallel reverse fold, double parallel fold, double gate fold, roll fold, accordion fold, half fold then half fold) and a form in which more areas are formed in the electronic device (e.g., the display (not shown)) (e.g., half fold then tri fold).

According to various embodiments, when the electronic device 100 includes a flexible display 330 that may form two areas, referring to 300 of FIG. 5 describing a folding state of the electronic device 100, the electronic device 100 may include a first housing 310, a second housing 311, a hinge 320, and a display 330.

According to various embodiments, the first housing 310 and the second housing 311 may be connected to each other. According to various embodiments, the first housing 310 and the second housing 311 may be connected by the hinge 320, and the first housing 310 and the second housing 311 may be connected to be pivotable or rotatable about (or with respect to) the hinge 320.

According to various embodiments, the display 330 may be exposed to the outside through a first portion of the first housing 310 and a second portion of the second housing 311. For example, the display 330 may be disposed across the hinge 320 on the first housing 310 and the second housing 311. According to various embodiments, the display 330 may include a first portion 330-1 of the display disposed on the first portion of the first housing 310 and a second portion 330-2 of the display disposed on the second portion of the second housing 311.

According to various embodiments, the display 330 may be a flexible display. For example, the display 330 may be folded or unfolded as the first housing 310 or the second housing 311 is rotated about the hinge 320. Hereinafter, although examples are described in which the display 330 is folded or unfolded, the disclosure is not limited thereto. For example, the display 330 may be implemented to be bendable (or warpable), and examples in which the display 330 is implemented in a bendable form may be applied in the same or similar manner to the examples in which the display 330 is folded or unfolded.

According to an embodiment, view 301 may illustrate a fully unfolded state of the electronic device 100, e.g., a state in which the second housing 311 is unfolded about the first housing 310. In an embodiment, in the fully unfolded state of the electronic device 100, the direction in which the first portion 310-1 of the first housing 310 faces and the direction in which the second portion 311-2 of the second housing 311 faces may be identical to each other. In the fully unfolded state of the electronic device 100, the entire front surface 330-1 and 330-2 of the display 330 may be exposed to the outside.

According to various embodiments, in the fully unfolded state of the electronic device 100, the processor (e.g., the processor 120) of the electronic device 100 may display an execution screen of a function of the electronic device 100 through the first portion 330-1 of the display 330 and the second portion 330-2 of the display 330.

According to an embodiment, view 303 may illustrate a state in which the electronic device 100 is fully out-folded about the hinge 320 so that the first housing 310 and the second housing 311 face each other. In an embodiment, in the fully out-folded state of the electronic device 100, the direction in which the first portion of the first housing 310 faces may be opposite to the direction in which the second portion of the second housing 311 faces. According to various embodiments, in the fully out-folded state of the electronic device 100, the third portion 310-2 of the first housing 310 and the fourth portion 311-2 of the second housing 311 may face each other, and the first portion 330-1 and second portion 330-2 of the display 330 may be exposed to face in opposite directions.

According to various embodiments, in the fully out-folded state of the electronic device 100, a portion to be activated of the first portion 330-1 of the display 330 and the second portion 330-2 of the display 330 and information to be displayed on the activated portion (e.g., the execution screen of the function of the electronic device 100) may be determined based on the direction in which the electronic device 100 is placed, the slope value of the electronic device 100. For example, the execution screen of the function of the electronic device 100 may be displayed on at least one of the activated first portion 330-1 or second portion 330-2 of the display 330 based on the direction in which the electronic device 100 is placed, the slope value of the electronic device 100.

According to an embodiment, view 305 may illustrate a state in which the electronic device 100 is out-folded about the hinge 320 so that the first portion 310-1 of the first housing 310 and the second portion 311-1 of the second housing 311 have an obtuse angle therebetween (semi-outfolded state).

According to various embodiments, in the state in which the electronic device is out-folded so that the first portion 310-1 of the first housing 310 and the second portion 311-1 of the second housing 311 have an obtuse angle therebetween, a portion to be activated of the first portion 330-1 of the display 330 and the second portion 330-2 of the display 330 and information to be displayed on the activated portion (e.g., the execution screen of the function of the electronic device 100) may be determined based on the direction in which the electronic device 100 is placed, the slope value of the electronic device 100.

According to various embodiments, in the fully out-folded state of the electronic device 100, a portion to be activated of the first portion 330-1 of the display 330 and the second portion 330-2 of the display 330 and information to be displayed on the activated portion (e.g., the execution screen of the function of the electronic device 100) may be determined based on the direction in which the electronic device 100 is placed, the slope value of the electronic device 100.

According to an embodiment, view 307 may illustrate a state in which the electronic device 100 is in-folded about the hinge 320 so that the first portion 310-1 of the first housing 310 and the second portion 311-1 of the second housing 311 have an acute angle therebetween (semi-infolded state).

According to various embodiments, in the state in which the electronic device is in-folded so that the first portion 310-1 of the first housing 310 and the second portion 311-1 of the second housing 311 have an acute angle therebetween, a portion to be activated of the first portion 330-1 of the display 330 and the second portion 330-2 of the display 330 and information to be displayed on the activated portion (e.g., the execution screen of the function of the electronic device 100) may be determined based on the direction in which the electronic device 100 is placed, the slope value of the electronic device 100.

Although FIG. 5 illustrates that the first portion 330-1 and second portion 330-2 of the display, disposed on the left and right of the hinge 320 vertically placed in the electronic device 100, are each rotated to fold, according to various embodiments, it may also be implemented that the hinge is placed horizontally in the electronic device 100, and the first portion 330-1 and second portion 330-2 of the display, disposed on the upper and lower sides of the hinge, are each rotated to fold.

According to various embodiments, when the electronic device 100 includes a flexible display 430 that may form three areas, referring to 400 of FIG. 6 describing a folding state of the electronic device 100, the electronic device 100 may include a first housing 410, a second housing 411, a third housing 412, a first hinge 420, a second hinge 421, and a display 430.

According to various embodiments, the first housing 410, the second housing 411, and the third housing 412 may be connected together. One side surface of the first housing 410 and one side surface of the second housing 411 may be connected to each other, and one side surface of the second housing 411 and one side surface of the third housing 412 may be connected to each other. According to various embodiments, the first housing 410 and the second housing 411 may be connected by the first hinge 420, and the first housing 410 and the second housing 411 may be connected to be pivotable or rotatable about (or with respect to) the first hinge 420. According to various embodiments, the second housing 411 and the third housing 412 may be connected by the second hinge 421, and the second housing 411 and the third housing 412 may be connected to be rotatable about the second hinge 421.

According to various embodiments, the display 430 may be exposed to the outside through a first portion of the first housing 410, a second portion of the second housing 411, and a third portion of the third housing 412. For example, the display 430 may be disposed across the hinge 420 on the first housing 410, the second housing 411, and the third housing 412. According to various embodiments, the display 430 may include a first portion 430-1 of the display disposed on the first portion 410-1 of the first housing 410, a second portion 430-2 of the display disposed on the second portion 411-1 of the second housing 411, and a third portion 430-3 of the display disposed on the third portion 412-1 of the third housing 412.

According to various embodiments, the display 430 may be a flexible display. For example, as the first housing 410 or the second housing 411 is rotated about the first hinge 420 or the second housing 411 or the third housing 412 is rotated about the second hinge 421, the display 430 may be folded or unfolded. Hereinafter, although examples are described in which the display 430 is folded or unfolded, the disclosure is not limited thereto. For example, the display 430 may be implemented to be bendable (or warpable), and examples in which the display 430 is implemented in a bendable form may be applied in the same or similar manner to the examples in which the display 430 is folded or unfolded.

According to an embodiment, view 401 may illustrate a fully unfolded state of the electronic device 100, e.g., a state in which the first housing 410 and the third housing 412 are unfolded about the second housing 411. According to various embodiments, in the fully unfolded state of the electronic device 100, the direction in which the first portion 410-1 of the first housing 410 faces, the direction in which the second portion 411-1 of the second housing 411 faces, and the direction in which the third portion 412-1 of the third housing 412 face may be identical. According to various embodiments, in the fully unfolded state of the electronic device 100, the display 430 may be exposed to the outside. For example, in the fully unfolded state of the electronic device 100, the entire front surface 430-1, 430-2, and 430-3 of the display 430 may be exposed to the outside.

According to various embodiments, in the fully unfolded state of the electronic device 100, the processor (e.g., the processor 120) of the electronic device 100 may display an execution screen of a function of the electronic device 100 through the first portion 430-1, second portion 430-2, and third portion 430-3 of the display 430.

According to an embodiment, view 403 may illustrate a fully folded state of the electronic device 100. In the fully folded state of the electronic device 100, the direction in which the first portion 410-1 of the first housing 410 faces and the direction in which the third portion 412-1 of the third housing 412 faces may be identical, and the direction in which the second portion 411-1 of the second housing 411 faces may be opposite to the direction in which the first portion 410-1 of the first housing 410 faces and the direction in which the third portion 412-1 of the third housing 412 faces. In the fully folded state of the electronic device 100, the second portion 411-1 of the second housing 411 may face (or be positioned opposite) the third portion 412-1 of the third housing 412, and the second portion 411-1 of the second housing 411 may face in the opposite direction from the first portion 410-1 of the first housing 410. In the fully folded state of the electronic device 100, only the first portion 430-1 of the display may be exposed to the outside, and the second portion 430-2 and third portion 430-3 of the display may not be exposed to the outside. According to various embodiments, in different folded directions, in the fully folded state, only the third portion 430-3 of the display may be exposed to the outside, and the first portion 430-1 and second portion 430-2 of the display may not be exposed to the outside.

In an embodiment, view 405 may illustrate a state in which the first housing 410 is unfolded about the second housing 411, and the third housing 412 is only partially fully folded about the second housing 411. According to various embodiments, in the partially fully folded state, the direction in which the first portion 410-1 of the first housing 410 faces and the direction in which the second portion 411-1 of the second housing 411 faces may be identical, and the direction in which the second portion 411-1 of the second housing 411 faces and the direction in which the third portion 412-1 of the third housing 412 faces may be opposite to each other. According to various embodiments, in the partially fully folded (fully out-folded) state of the electronic device 100, a fifth portion 411-2 of the second housing 411 and a sixth portion 412-2 of the third housing 412 may face each other, the first portion 430-1 and the second portion 430-2 of the display 430 may be exposed in the same direction, and the third portion 430-3 of the display may be exposed in the direction opposite from the second portion 430-2.

According to various embodiments, in the partially fully folded state of the electronic device 100, the processor (e.g., the processor 120) of the electronic device 100 may determine the portion to be activated and information (e.g., the execution screen of the function of the electronic device 100) to be displayed on the activated portion, based on the direction in which the electronic device 100 is placed, the slope value of the electronic device 100. For example, the processor (e.g., the processor 120) of the electronic device 100 may display the execution screen of the function of the electronic device 100 through the first portion 430-1 of the display 430 and the second portion 430-2 of the display 430 or display the execution screen of the function of the electronic device 100 through the third portion 430-3 of the display, based on the direction in which the electronic device 100 is placed, the slope value of the electronic device 100.

According to various embodiments, the second housing 411 and the third housing 412 may be unfolded, and the first housing 410 may be in the fully folded state. Although the out-folded state is shown and described in connection with view 405, it may also be implemented in the in-folded state. For example, when the first housing 410 and the second housing 411 may be in-folded about the first hinge 420, and the second housing 411 and the third housing 412 are unfolded, only the third portion 430-3 of the display may be exposed to the outside.

In an embodiment, view 407 may illustrate a stand state in which the first housing 410 and the second housing 411 are fully folded, and the second housing 411 and the third housing 412 have a predetermined angle therebetween. According to various embodiments, the third housing 412 contacts the ground and plays a role as a support, and the processor (e.g., the processor 120) of the electronic device 100 may activate the first portion 430-1 of the display 430, deactivate the second portion 430-2 and third portion 430-3 of the display 430, and determine information to be displayed on the first portion 430-1 of the display 430.

FIG. 6 illustrates that the first portion 430-1, second portion 430-2, and third portion 430-3 of the display, disposed on the left and right of the first hinge 420 and the second hinge 421 disposed vertically in the electronic device 100, are each rotated to fold. However, according to various embodiments, in the electronic device 100, the first hinge 420 and the second hinge 421 each may be placed horizontally, and the first portion 430-1, the second portion 430-2, and the third portion 430-3 of the display, disposed on the upper and lower sides of the first hinge 420 and the second hinge 421 may be each rotated to fold.

The folding states shown in FIGS. 5 and 6 are merely an example, but without being limited thereto, various folding states are possible based on at least one of the number of housings and hinges, the unfolded state, in-folded state, out-folded state, the angle between the housings, the direction in which the electronic device is placed, or the inclined degree of the electronic device.

Although not shown in FIGS. 5 and 6, according to an embodiment, the electronic device 101 may include at least one sensor for detecting the folding state. According to various embodiments, the at least one sensor may include at least one of, for example, and without limitation, a hall sensor, a proximity sensor, an angle sensor, a load cell, an infrared sensor, a pressure sensor, an acceleration sensor, a gyro sensor, an electromagnetic sensor, or the like. However, the at least one sensor for detecting the folding state of the electronic device 100 is not limited to the above-described examples.

According to various embodiments, if there is a pre-stored function corresponding to the folding state or an authenticated space where the electronic device 100 is positioned, the processor (e.g., the processor 120) of the electronic device 100 may perform the pre-stored function.

Figure 7:
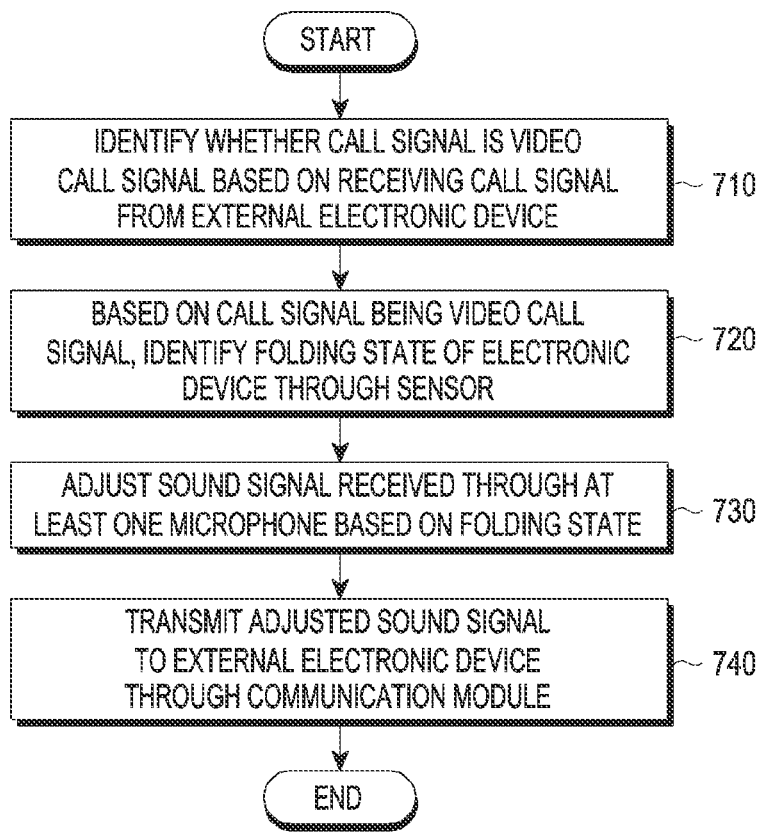
FIG. 7 is a flowchart illustrating an example operation of adjusting a sound signal received through a microphone according to various embodiments.

FIG. 7 is a flowchart illustrating an example operation of adjusting a sound signal received through a microphone according to various embodiments.

According to various embodiments, referring to FIG. 7, in operation 710, based on receiving a call signal from an external electronic device (e.g., the electronic device 104 of FIG. 1), the electronic device (e.g., the electronic device 100 of FIG. 1 or the processor 120 of FIG. 1) may identify whether the call signal is a video call signal.

According to various embodiments, in operation 720, based on the call signal being a video call signal, the electronic device may identify the folding state of the electronic device through a sensor (e.g., the sensor module 176 of FIG. 1). For example, the electronic device may identify the folding state of the electronic device through a sensor disposed between the housings to sense the angle of the hinge on which the housing is rotated. According to various embodiments, the electronic device may identify the folding state of the electronic device by a motion sensor (e.g., acceleration sensor or gyro sensor) or a magnetic force sensor (e.g., a Hall sensor).

According to various embodiments, the folding state of the electronic device and the position of at least one microphone according to the folding state of the electronic device are described in greater detail below with reference to FIGS. 8A, 8B, 9A and 9B.

According to various embodiments, the electronic device may be a slidable electronic device as shown in FIGS. 2, 3 and 4, and the placement of the microphone in the slidable device is described in greater detail below with reference to FIGS. 8A and 8B.

According to various embodiments, the electronic device may store the folding state information in the memory when the folding state of the electronic device is changed, using a motion sensor (e.g., acceleration sensor or gyro sensor) or magnetic force sensor (e.g., Hall sensor). For example, upon receiving a video call signal, the electronic device may identify the folding state of the electronic device stored in the memory.

According to various embodiments, in operation 730, the electronic device may adjust the sound signal received through at least one microphone (e.g., the input module 150 of FIG. 1) based on the folding state.

According to various embodiments, the electronic device may determine the direction of the sound signal based on at least one of the magnitude of the sound signal received through each of the at least one microphone or the reception time of the sound signal.

For example, if a sound signal for one sound is received by each of the at least one microphone, the waveforms of the sound signals are similar, but depending on the positions of the microphones, the sound signal for the microphone closer to the sound source has a larger signal magnitude while the sound signal for the microphone far from the sound source has a smaller signal magnitude so that the electronic device may identify the direction of the sound based on the magnitude of the sound signals with similar waveforms received from each microphone.

According to various embodiments, if the sound signal for one sound is received by each of at least one microphone, the waveform of each sound signal is similar, but since there is a difference in sound signal reception time between the microphone closer to the sound source and the microphone far from the sound source depending on the position of the microphone, the electronic device may identify the direction of sound based on the reception times of the sound signals with similar waveforms received by each microphone.

According to various embodiments, when the folding state of the electronic device is the fully folded state or fully unfolded state, the electronic device may reduce the sound signals, as a first level, other than the sound signal received from the front of the electronic device among the sound signals received through the microphones. For example, if the call signal is a video call, and the electronic device is in the fully folded state or fully unfolded state, the electronic device may reduce the magnitude of the sound signals, other than the sound signal received from the front of the electronic device, by about 6 dB. For example, the front of the electronic device may refer, for example, to an area that faces the main display. According to various embodiments, in the case of a video call, the area captured by the activated camera may be denoted as the front of the electronic device.

According to various embodiments, when the folding state of the electronic device is the semi-folded state, the electronic device may reduce the sound signals other than the sound signal received from the front of the electronic device, as a second level higher than the first level. For example, if the call signal is a video call, and the electronic device is in the semi-folded state, the electronic device may reduce the magnitude of the sound signals, other than the sound signal received from the front of the electronic device, by about 12 dB.

According to various embodiments, the semi-folded state may refer, for example, to a state other than the fully folded state or fully unfolded state of the electronic device and may be a state in which the angle between the housings is between 0 degrees and 180 degrees or between 180 degrees and 360 degrees. For example, when the angle between the housings is 0 degrees, it is the fully in-folded state of the electronic device, when the angle between the housings is 180 degrees, it is the fully unfolded state of the electronic device, and when the angle between the housings is 360 degrees, it is the fully out-folded state of the electronic device.

According to various embodiments, the electronic device may increase the magnitude of the voice received from the front of the electronic device among the received sound signals.

As described above, in the case of a video call, the user may be on the phone while typically looking at the display (e.g., the display module 160 of FIG. 1) of the electronic device. Thus, it is highly likely that the sound from the front of the electronic device is the user's voice. Accordingly, it is possible to enhance the noise canceling effect by increasing the sound signal received from the front of the electronic device while reducing the other sound signals. For example, the front of the electronic device may refer, for example, to an area that faces the main display. According to various embodiments, in the case of a video call, the area captured by the activated camera may be denoted as the front of the electronic device.

According to various embodiments, unless the call signal is a video call signal, the electronic device may reduce the sound signals other than the sound signal with the largest magnitude among the received sound signals. For example, if the call signal is a voice call signal, since the sound signal with the largest magnitude among the sound signals received through at least one microphone has a high chance of being the user's voice, the electronic device may reduce the other sound signals to thereby enhance the noise canceling effect.

According to various embodiments, if the call signal is changed from the voice call signal to the video call signal, the electronic device may adjust the sound signal received through at least one microphone based on the folding state of the electronic device. For example, if the call signal is changed from the voice call signal to the video call signal, the electronic device may identify the direction of the sound signal and reduce the other signals than the sound signal received from the front of the electronic device based on the folding state of the electronic device. For example, the front of the electronic device may refer, for example, to an area that faces the main display. According to various embodiments, in the case of a video call, the area captured by the activated camera may be denoted as the front of the electronic device.

According to various embodiments, the electronic device may adjust the received sound signal further considering the user's grip on the electronic device or the direction of the electronic device. For example, the electronic device may identify the direction of the electronic device through the acceleration sensor or gyro sensor and adjust the sound signal received through at least one microphone further considering the direction of the electronic device. According to various embodiments, the electronic device may identify the user's grip on the electronic device through a touch sensor, pressure sensor, or illuminance sensor and adjust the sound signal received through at least one microphone further considering the state of the grip. According to various embodiments, the direction of the electronic device or the grip state is described in greater detail below with reference to FIGS. 14, 15A, 15B, 16A and 16B.

As described above, it is possible to more precisely identify the direction of sound signal by further considering the direction of the electronic device or the grip state.

According to various embodiments, if a call signal is received with an external earphone device connected, and the sound signal is received through the microphone included in the external earphone device, the electronic device may reduce the other voices than the sound signal with the largest magnitude regardless of the type of the call signal.

According to various embodiments, in a case where a call signal is received with the external earphone device connected, and the sound signal is received through at least one microphone included in the electronic device, if the call signal is a video call, the electronic device may identify the direction of the sound signal and reduce the other signals than the sound signal received from the front of the electronic device based on the folding state of the electronic device.

According to various embodiments, in operation 740, the electronic device may transmit the adjusted sound signal through the communication module (e.g., the communication module 190 of FIG. 1) to an external electronic device.

Figure 8A:
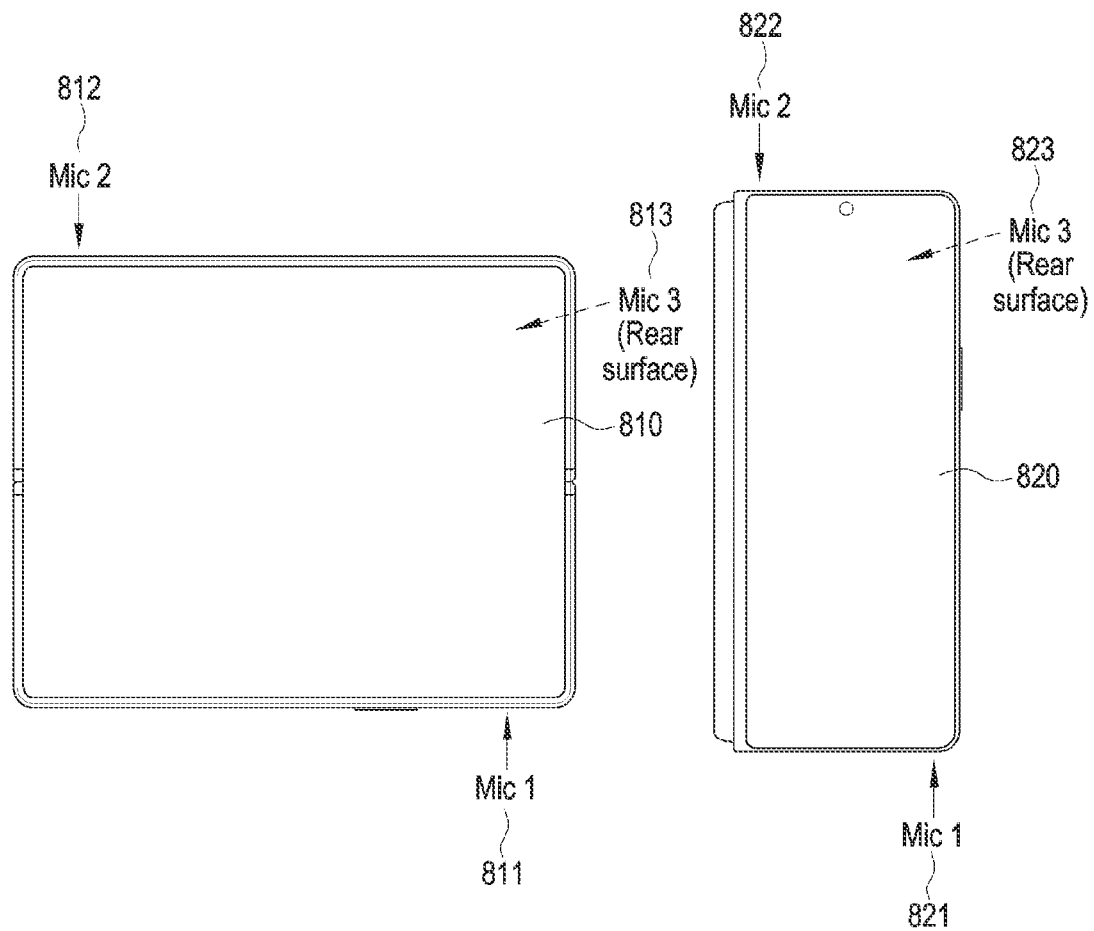
FIG. 8A is a diagram illustrating a folding state of an electronic device according to various embodiments.

FIG. 8A is a diagram illustrating a folding state of an electronic device according to various embodiments.

According to various embodiments, referring to FIG. 8A, in the fully unfolded state, the electronic device 810 (e.g., the electronic device 100 of FIG. 1) may include a plurality of microphones 811, 812, and 813. For example, the electronic device 810 may include a first microphone 811 on a lower side, a second microphone 812 on an upper side, and a third microphone 813 on the rear surface.

According to various embodiments, the electronic device 820 (e.g., the electronic device 100 of FIG. 1) in the fully folded state may include a plurality of microphones 821, 822, and 823. For example, the electronic device 810 may include a first microphone 821 on a lower side and a second microphone 822 on an upper side. Further, when the electronic device is in the fully in-folded state, a third microphone 823 may be included on the rear surface of the electronic device 820. According to various embodiments, when the electronic device is in the fully out-folded state, the third microphone 823 may be included between the housings.

Figure 8B:
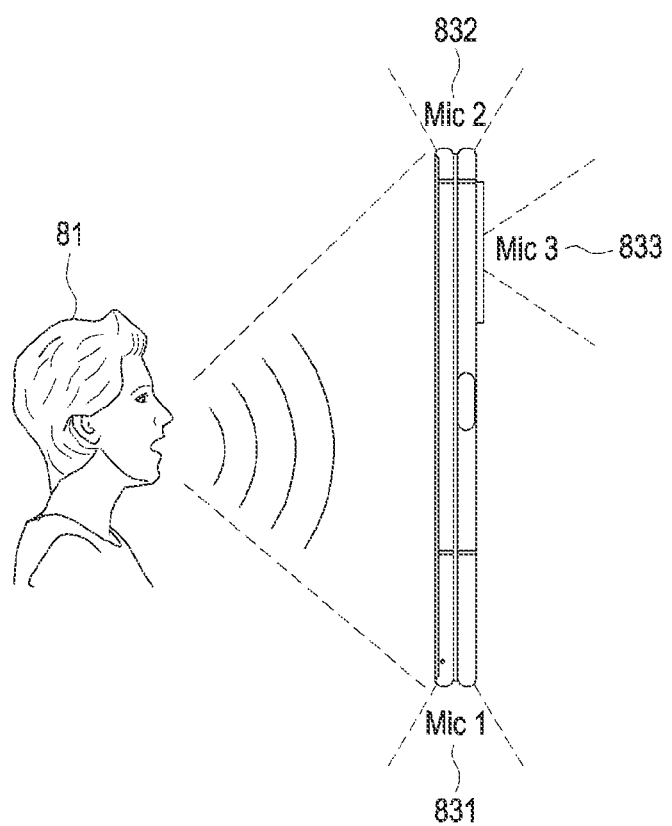
FIG. 8B is a diagram illustrating a placement of a microphone according to a folding state of an electronic device according to various embodiments.

FIG. 8B is a diagram illustrating example placement of a microphone according to a folding state of an electronic device according to various embodiments.

According to various embodiments, referring to FIG. 8B, if the user 81 issues an utterance while looking at the front of the electronic device, the utterance may be received through the first microphone 831 disposed on the lower side of the electronic device, the second microphone 832 disposed on the upper side of the electronic device, and the third microphone 833 disposed on the rear surface of the electronic device.

According to various embodiments, the electronic device may receive the sound signal including the voice of the user 81 through each of the first microphone 831 to the third microphone 833 and identify the direction of the sound signal based on the difference in magnitude or reception time between the received sound signals.

According to various embodiments, the number and positions of the microphones are not limited to those shown in FIGS. 8A and 8B.

According to various embodiments, when the electronic device is a slidable device as shown in FIGS. 2, 3 and 4, the microphones may also be disposed as shown in FIGS. 8A and 8B.

Figure 9A:
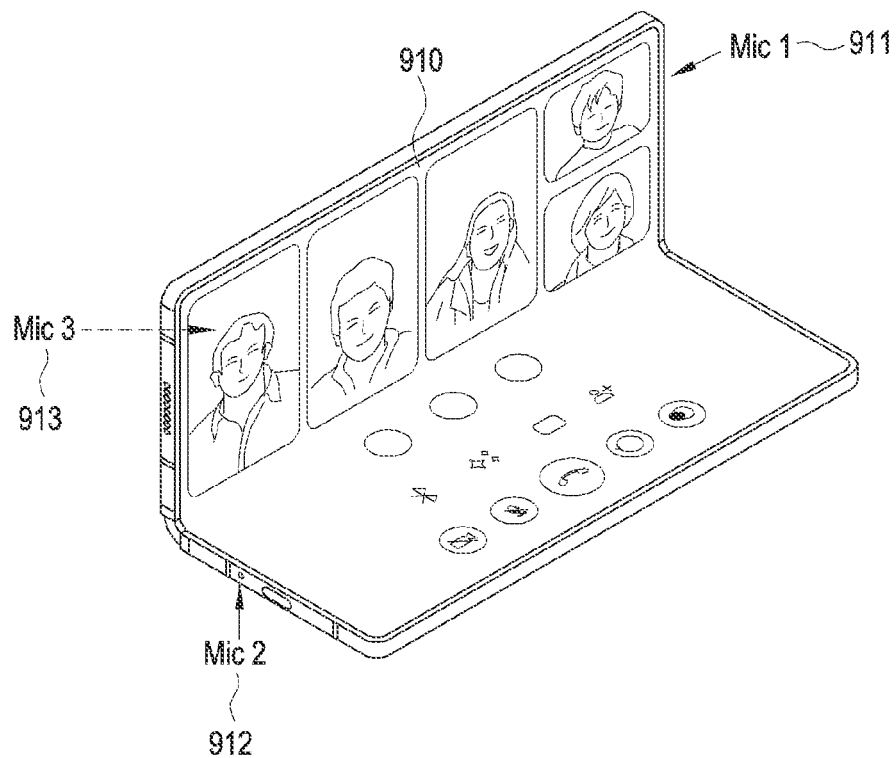
FIG. 9A is a diagram illustrating a folding state of an electronic device according to various embodiments.

FIG. 9A is a diagram illustrating a folding state of an electronic device according to various embodiments.

According to various embodiments, referring to FIG. 9A, in the semi-folded state, the electronic device 910 (e.g., the electronic device 100 of FIG. 1) may include a plurality of microphones 911, 912, and 913. For example, the electronic device 910 may include a first microphone 911 on the right side of the first housing, a second microphone 912 on the left side of the second housing, and a third microphone 913 on the rear surface of the first housing.

According to various embodiments, the third microphone 913 may face the bottom surface depending on the direction of the electronic device 910.

Figure 9B:
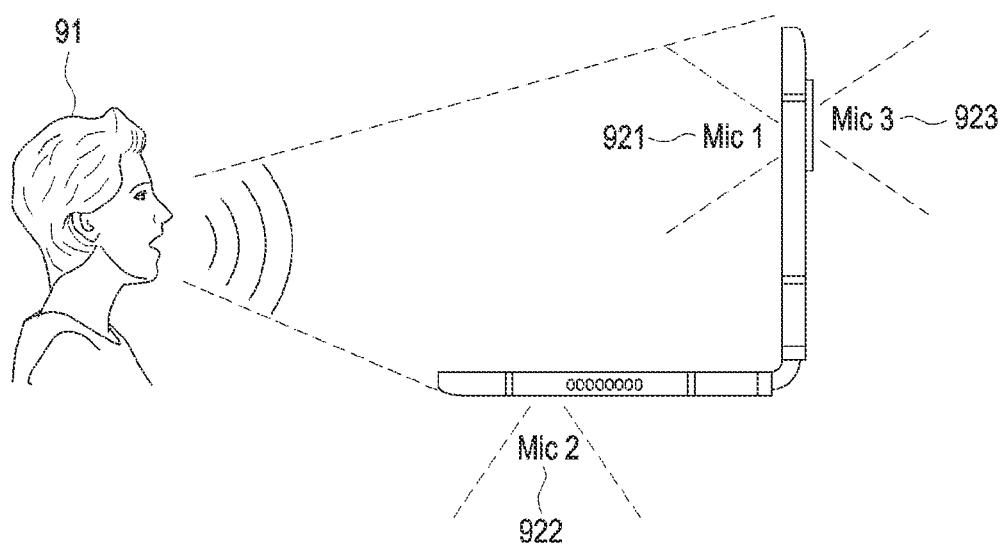
FIG. 9B is a diagram illustrating a placement of a microphone according to a folding state of an electronic device according to various embodiments.

FIG. 9B is a view illustrating example placement of a microphone according to a folding state of an electronic device according to various embodiments.

According to various embodiments, referring to FIG. 9B, if the user 91 issues an utterance while looking at the front of the electronic device 910, the electronic device 910 may receive the user's utterance through the first microphone 921 disposed on the right side of the first housing, the second microphone 922 disposed on the left side of the second housing, and the third microphone 923 disposed on the rear surface of the first housing.

According to various embodiments, the electronic device may receive the sound signal including the voice of the user 91 through each of the first microphone 921 to the third microphone 923 and identify the direction of the sound signal based on the difference in magnitude or reception time between the received sound signals.

According to various embodiments, the number and positions of the microphones are not limited to those shown in FIGS. 9A and 9B.

Although FIGS. 9A and 9B illustrate that the angle between the housings is 90 degrees, according to various embodiments, the angle between the housings may be between 0 degrees and 90 degrees or between 90 degrees and 180 degrees, and the electronic device may determine the degree of adjusting of the sound signal based on the angle between the housings. For example, if the electronic device reduces the other signals than the signal received from the front among the sound signals, as a first level, when the angle between the housings is between 0 degrees and 180 degrees, and reduces the other signals than the signal received from the front among the sound signals, as a second level, when the angle between the housings is 90 degrees, the electronic device may reduce the other signals than the signal received from the front among the sound signals, as a level between the first level and the second level when the angle between the housings is between 0 degrees and 90 degrees or between 90 degrees and 180 degrees.

Although FIGS. 9A and 9B illustrate that the electronic device includes one hinge, according to various embodiments, the electronic device may include two or more hinges. According to various embodiments, an articulated electronic device including two or more hinges is described in greater detail below with reference to FIG. 13.

Figure 10:
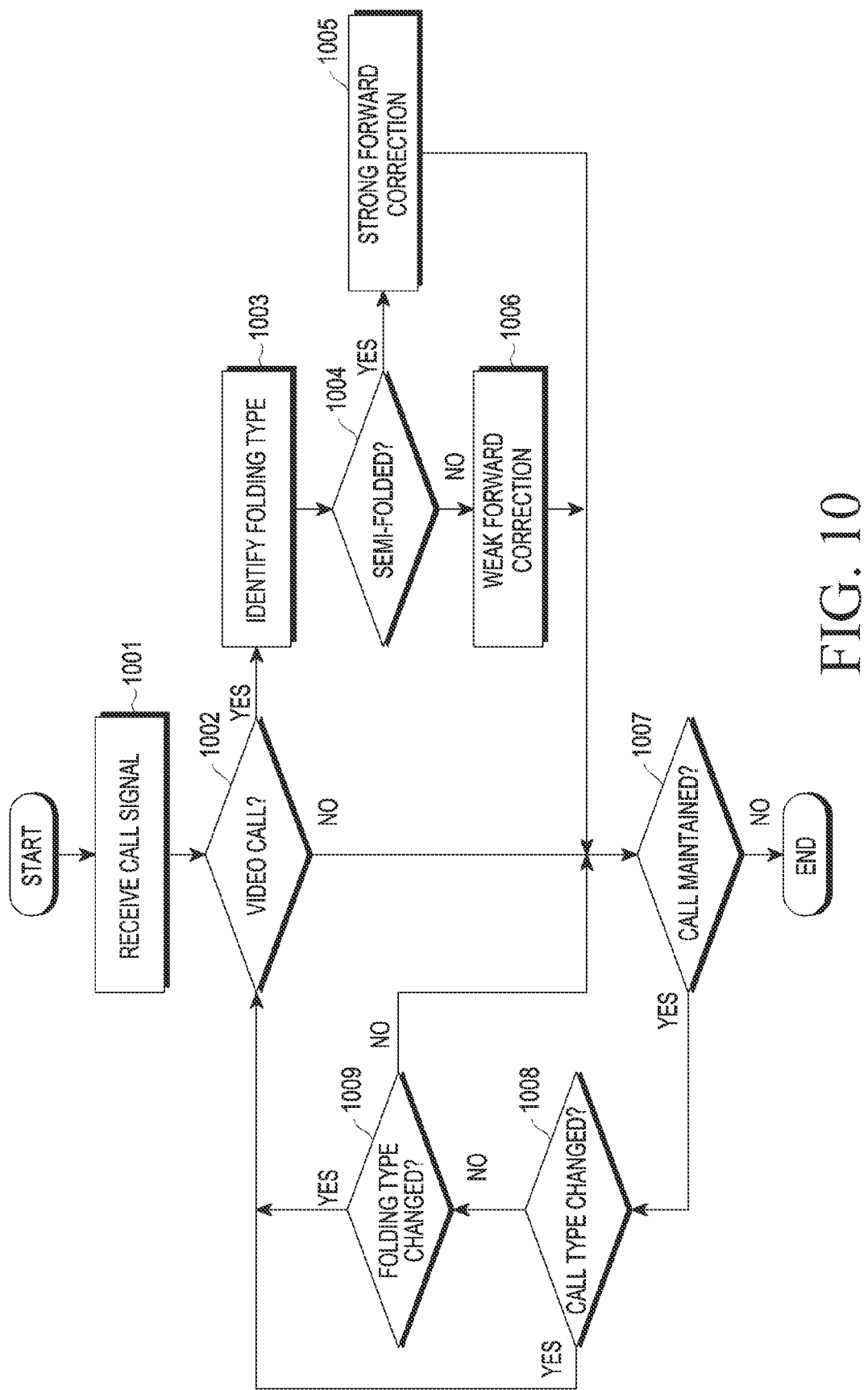
FIG. 10 is a flowchart illustrating an example sound signal adjusting operation of an electronic device according to various embodiments.

FIG. 10 is a flowchart illustrating an example sound signal adjusting operation of an electronic device according to various embodiments.

According to various embodiments, referring to FIG. 10, in operation 1001, an electronic device (e.g., the electronic device 100 of FIG. 1 or the processor 120 of FIG. 1) may receive a call signal.

According to various embodiments, in operation 1002, the electronic device may identify whether the call signal is a video call.

According to various embodiments, if the call signal is a video call (Yes in operation 1002), the electronic device may identify the folding type in operation 1003. For example, the electronic device may identify the folding type of the electronic device through a sensor (e.g., the sensor module 176 of FIG. 1 (e.g., an acceleration sensor, a gyro sensor, or a Hall sensor).

According to various embodiments, if the folding state is the semi-folded state (Yes in operation 1004), the electronic device may perform strong forward adjusting in operation 1005.

For example, the semi-folded state may refer, for example, to a state other than the fully folded state or fully unfolded state of the electronic device and may be a state in which the angle between the housings is between 0 degrees and 180 degrees or between 180 degrees and 360 degrees. For example, when the angle between the housings is 0 degrees, it is the fully in-folded state of the electronic device, when the angle between the housings is 180 degrees, it is the fully unfolded state of the electronic device, and when the angle between the housings is 360 degrees, it is the fully out-folded state of the electronic device.

According to various embodiments, performing strong forward adjusting may refer, for example, to strongly reducing the other sound signals than the signal received from the front of the electronic device among the sound signals. For example, upon performing strong forward adjusting, the electronic device may reduce the magnitude of the sound signals, other than the sound signal received from the front of the electronic device, by about 12 dB.

According to various embodiments, the electronic device may adjust the degree of forward adjusting based on the angle between the housings. For example, when the angle between the housings is 90 degrees (or 270 degrees), the electronic device may reduce the magnitude of the other sound signals than the sound signal received from the front by about 12 dB and, when the angle between the housings is 45 degrees, 135 degrees, 225 degrees, or 315 degrees, the electronic device may reduce the magnitude of the other sound signals than the sound signal received from the front by about 9 dB.

According to various embodiments, unless the folding state is the semi-folded state (No in operation 1004), the electronic device may perform weak forward adjusting in operation 1006.

For example, the fully folded state or fully unfolded state may be non-semi-folded states.

According to various embodiments, performing weak forward adjusting may refer, for example, to weakly reducing the other sound signals than the signal received from the front of the electronic device among the sound signals. For example, upon performing weak forward adjusting, the electronic device may reduce the magnitude of the sound signals, other than the sound signal received from the front of the electronic device, by about 6 dB.

According to various embodiments, along with operation 1005 or 1006, the electronic device may further perform adjusting to increase the magnitude of the sound signal received from the front among the sound signals.

According to various embodiments, unless the call signal is a video call (No in operation 1002), the electronic device may identify whether the call is maintained in operation 1007. For example, maintaining the call may refer, for example, to the call signal being continuously received so that the call is not terminated. According to various embodiments, even after the forward adjusting (operation 1005 or 1006), the electronic device may identify whether the call is maintained.

According to various embodiments, if the call signal is a voice call signal, the electronic device may perform no adjusting on the received sound signal or may perform non-directional sound adjusting to identify whether the call is maintained.

According to various embodiments, non-directional adjusting may refer, for example, to reducing the other signals than the sound signal with the largest magnitude among the sound signals received through the microphone regardless of the direction of the sound signal.

According to various embodiments, if the call is maintained (Yes in operation 1007), the electronic device may identify whether the type of call is changed in operation 1008. According to various embodiments, if the type of call is changed (Yes in operation 1008), the electronic device may proceed to operation 1002 to identify whether the type of call is a video call.

According to various embodiments, if the type of call is maintained (No in operation 1008), the electronic device may identify whether the folding type of the electronic device is changed in operation 1009.

According to various embodiments, if the folding type is changed (Yes in operation 1009), the electronic device may proceed to operation 1002, identifying whether the call signal is a video call. According to various embodiments, if the call signal is a video call (Yes in 1002), the electronic device may perform operations 1003 to 1006, performing adjusting on the sound signal depending on the folding state of the electronic device.

According to various embodiments, if the folding type is maintained (No in operation 1009), the electronic device may proceed to operation 1007, identifying whether the call is maintained.

According to various embodiments, unless the call is maintained (No in operation 1007), the electronic device may terminate the sound adjusting process. For example, if the call signal is not received (e.g., when the call is disconnected), the electronic device may terminate the sound adjusting process.

Figure 11:
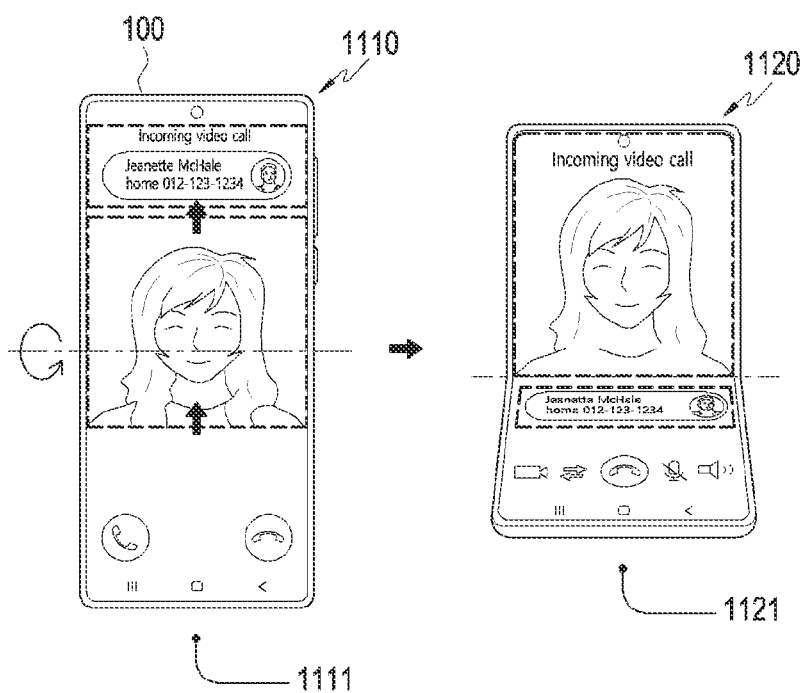
FIG. 11 is a diagram illustrating a video call operation of an electronic device according to various embodiments.

FIG. 11 is a diagram illustrating a video call operation of an electronic device according to various embodiments.

According to various embodiments, referring to FIG. 11, when the electronic device 101 (e.g., the electronic device 100 of FIG. 1 or the processor 120 of FIG. 1) in the fully unfolded state 1110 performs a video call, the electronic device 100 may identify the direction of the sound signal received through the microphone 1111 and reduce the other signals than the sound signal received from the front, as the first level.

According to various embodiments, if the folding state of the electronic device 100 is changed to the semi-folded state 1120 while performing the video call, the electronic device 100 may identify the direction of the sound signal received through the microphone 1121 and reduce the other signals than the sound signal received from the front, as a second level higher than the first level.

Figure 12:
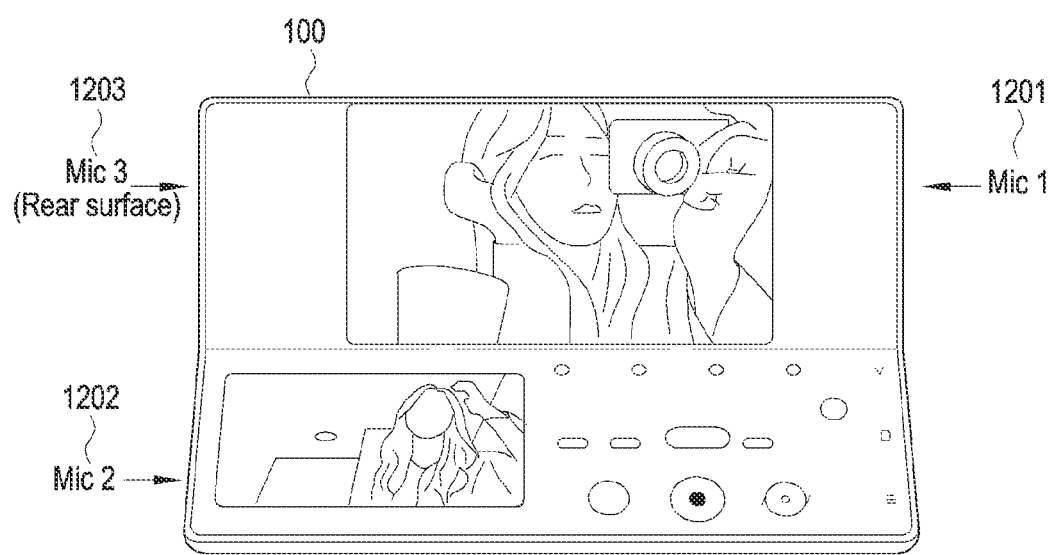
FIG. 12 is a diagram illustrating a video recording operation of an electronic device according to various embodiments.

FIG. 12 is a diagram illustrating a video recording operation of an electronic device according to various embodiments.

According to various embodiments, referring to FIG. 12, when the video recording function of the electronic device 100 (e.g., the electronic device 100 of FIG. 1 or the processor 120 of FIG. 1) is performed, the user may record a video while typically looking at the display (e.g., the display module 160 of FIG. 1) of the electronic device 100. Thus, the electronic device 100 may identify the folding state of the electronic device 100 and adjust the sound signals received through the microphones 1201, 1202, and 1203 (e.g., the input device 150 of FIG. 1) based on the folding state.

According to various embodiments, upon recording a video using the rear camera (e.g., the camera module 180 of FIG. 1) or the front camera (e.g., the camera module 180 of FIG. 1) of the electronic device 100 or recording a video using simultaneously the rear camera and the front camera, the electronic device 100 may identify the folding state of the electronic device 100 and adjust the sound signals received through the microphones 1201, 1202, and 1203 based on the folding state. For example, if the user activates the video recording function and the function for reducing ambient sound, the electronic device 100 may reduce the other sounds than the user's voice.

According to various embodiments, upon recording a video in the fully unfolded state of the electronic device 100, the electronic device 100 may identify the directions of the sound signals received through the microphones 1201, 1202, and 1203 and may reduce the other signals than the sound signal received from the front of the electronic device 100, as a first level. According to various embodiments, upon recording a video in the semi-folded state of the electronic device 100, the electronic device 100 may identify the directions of the sound signals received through the microphones 1201, 1202, and 1203 and reduce the other signals than the sound signal received from the front of the electronic device 100, as a second level higher than the first level.

According to various embodiments, when the electronic device 100 records a video, the electronic device may receive the direction of the sound signal from the user. The electronic device may identify the directions of the sound signals received through the microphones 1201, 1202, and 1203 and reduce the other signals than the sound signal received in the direction selected by the user, as the second level higher than the first level.

Figure 13:
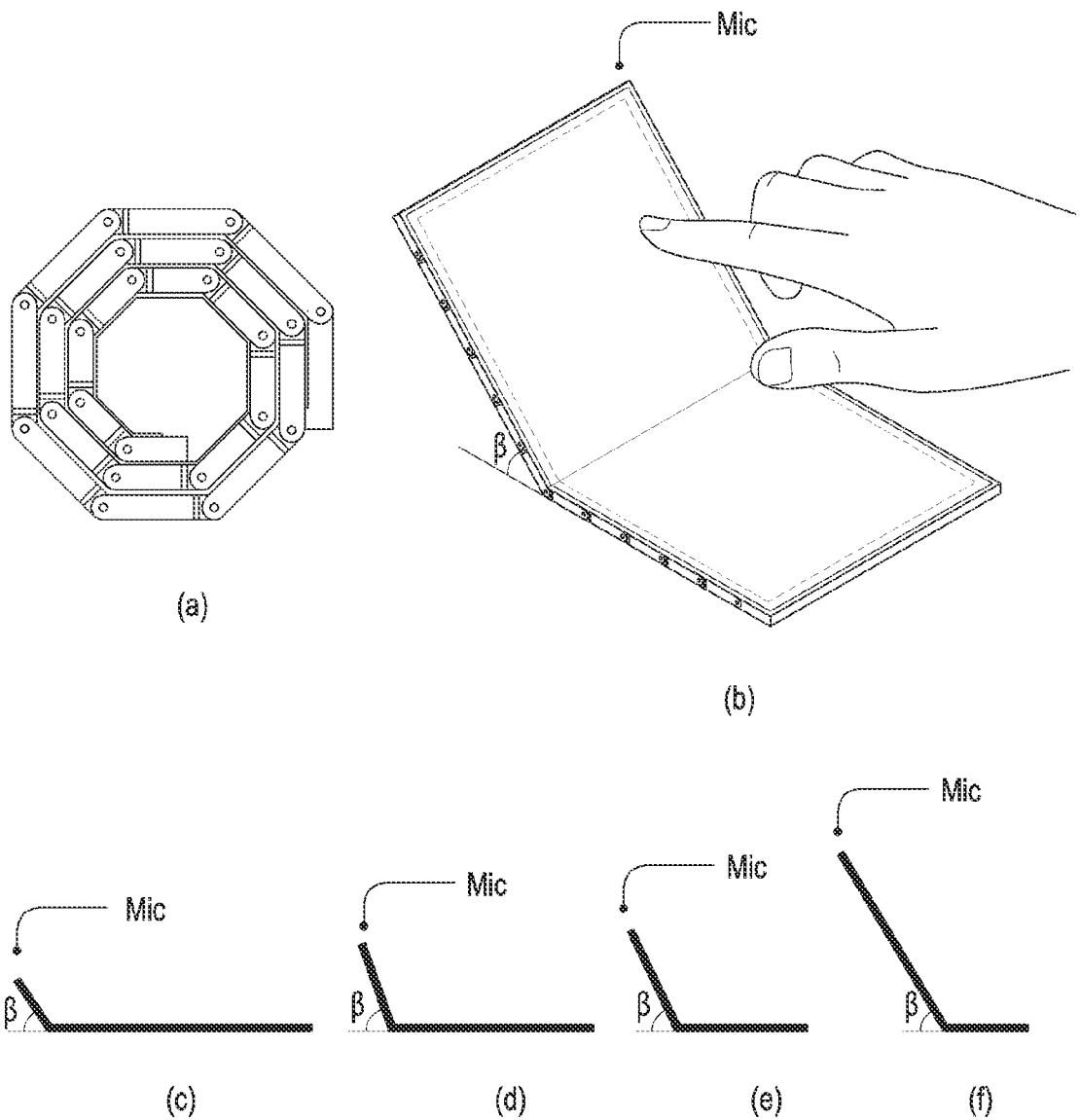
FIG. 13 is a diagram illustrating an articulated form factor of an electronic device according to various embodiments.

FIG. 13 is a diagram illustrating an example articulated form factor of an electronic device according to various embodiments. For example, as shown in FIG. 13(*a*), the electronic device may have an articulated form factor with two or more hinges.

According to various embodiments, referring to FIG. 13(*b*), if one of the plurality of hinges has an angle, the electronic device (e.g., the electronic device 100 of FIG. 1) may be in the semi-folded state and, as shown in FIGS. 13(*c*), 13(*d*), 13(*e*) and 13(*f*), the position of the microphone may be changed depending on the position of the hinge with the angle among the plurality of hinges. For example, the microphone positioned on the bottom in FIG. 13(*c*) may be positioned on the rear surface in FIG. 13(*f*).

According to various embodiments, the electronic device may identify the folding state of the electronic device further considering the position of the hinge with the angle. According to various embodiments, the electronic device may adjust the sound signal received through the microphone considering the position of the hinge with the angle.

For example, since the distance between the user and the microphone, the height of the microphone, and/or the direction of the microphone is varied depending on the position of the hinge with the angle among the plurality of hinges, the electronic device may adjust the sound signal received through the microphone based on the position of the microphone, changed depending on the position of the hinge with the angle.

Figure 14:
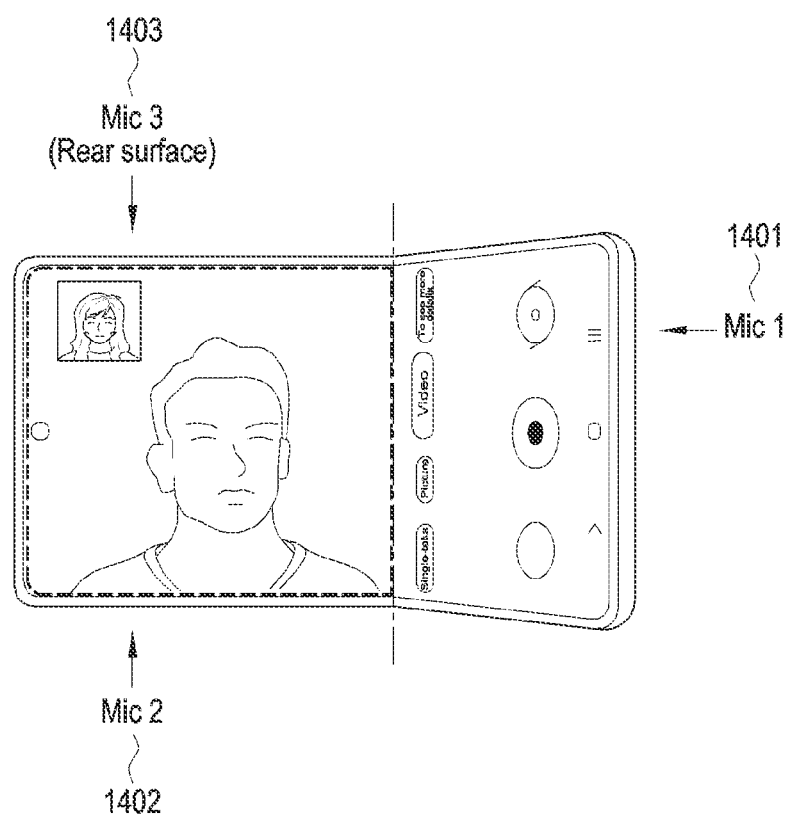
FIG. 14 is a diagram illustrating a video recording operation of an electronic device according to various embodiments.

FIG. 14 is a diagram illustrating a video recording operation of an electronic device according to various embodiments. For example, the electronic device may adjust the sound signals received through the microphones 1401, 1402, and 1403 further considering the direction of the electronic device while recording a video.

According to various embodiments, referring to FIG. 14, the electronic device (e.g., the electronic device 100 of FIG. 1 or the processor 120 of FIG. 1) may perform the video recording operation in the semi-folded state in which the electronic device is folded to the left and right on the hinge.

According to various embodiments, the electronic device may identify the direction of the electronic device through a sensor (e.g., the sensor module 176 of FIG. 1 (e.g., a gyro sensor) and adjust the sound signals received through the microphones 1401, 1402, and 1403 further considering the direction of the electronic device.

For example, since the position of the microphone differs between when the electronic device performs the video recording operation in the semi-folded state in which the electronic device is folded up and down on the hinge as shown in FIG. 12 and when the electronic device performs the video recording operation in the semi-folded state in which the electronic device is folded to the left and right on the hinge as shown in FIG. 14, the electronic device may identify the direction of the sound signal considering the position of the microphone and adjust the sound signal. For example, referring to FIG. 12 illustrating an embodiment in which the electronic device is folded up and down on the hinge, the first microphone 1201 may be disposed on the right side of the erected first housing, the second microphone 1202 may be disposed on the left side of the second housing placed on the floor, and the third microphone 1203 may be disposed on the rear surface of the erected first housing. Referring to FIG. 14 illustrating an embodiment in which the electronic device is folded to the left and right on the hinge, the first microphone 1401 is disposed on the right side of the second housing in which the display is folded to face left, the second microphone 1402 is disposed on the lower side of the first housing in which the display is folded to face forward, and the second microphone 1403 is disposed on the rear surface of the first housing so that the electronic device may identify the direction of the sound signal considering the position of the microphone and adjust the sound signal.

Figure 15A:
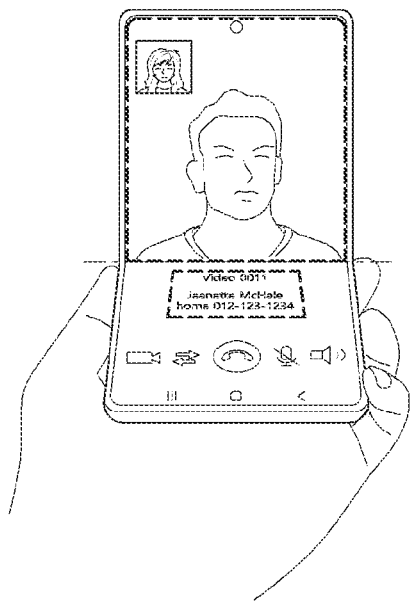
FIG. 15A is a diagram illustrating a grip state of an electronic device according to various embodiments.

FIG. 15A is a diagram illustrating a grip state of an electronic device according to various embodiments. For example, FIG. 15A illustrates a state in which the user grips, in the left hand, the electronic device in the semi-folded state in which the electronic device is folded up and down on the hinge.

Figure 15B:
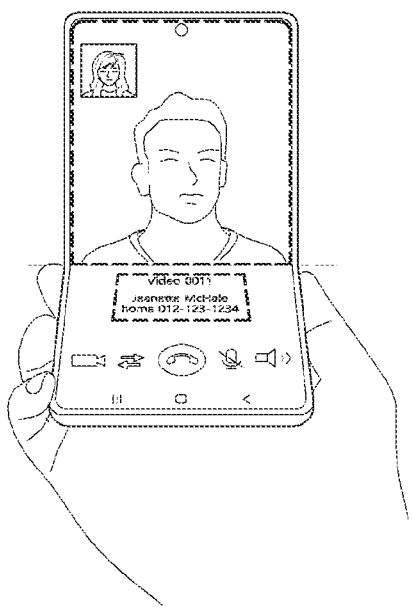
FIG. 15B is a diagram illustrating a grip state of an electronic device according to various embodiments.

FIG. 15B is a diagram illustrating a grip state of an electronic device according to various embodiments. For example, FIG. 15B illustrates a state in which the user grips, in the right hand, the electronic device in the semi-folded state in which the electronic device is folded up and down on the hinge.

Figure 16A:
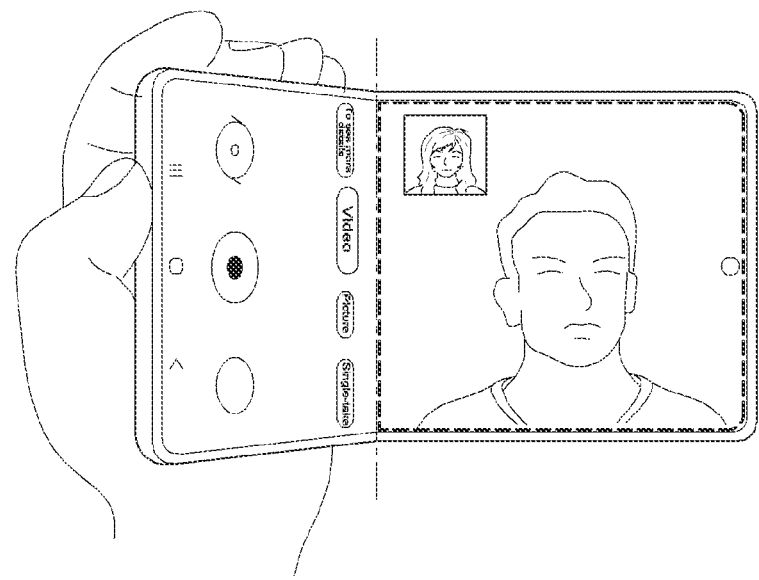
FIG. 16A is a diagram illustrating a grip state of an electronic device according to various embodiments.

FIG. 16A is a diagram illustrating a grip state of an electronic device according to various embodiments. For example, FIG. 16A illustrates a state in which the user grips, in the left hand, the electronic device in the semi-folded state in which the electronic device is folded left and right on the hinge.

Figure 16B:
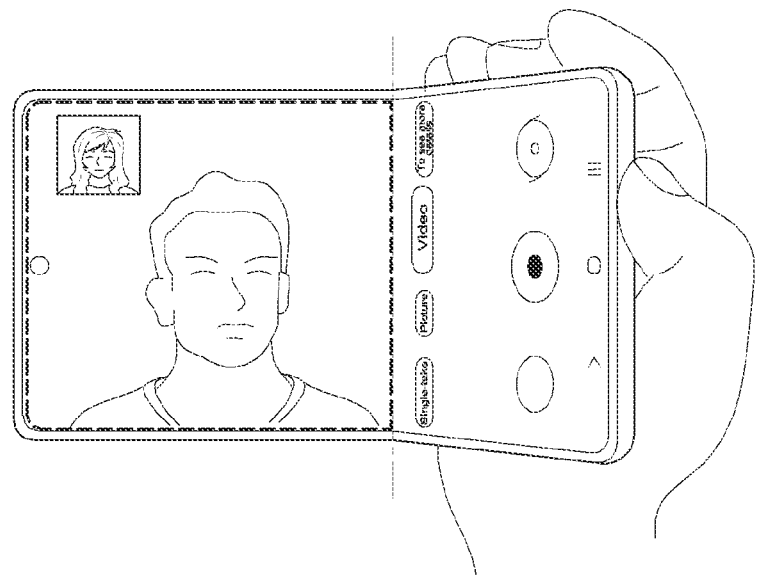
FIG. 16B is a diagram illustrating a grip state of an electronic device according to various embodiments.

FIG. 16B is a diagram illustrating a grip state of an electronic device according to various embodiments. For example, FIG. 16B illustrates a state in which the user grips, in the right hand, the electronic device in the semi-folded state in which the electronic device is folded left and right on the hinge.

According to various example embodiments, an electronic device (e.g., the electronic device 100 of FIG. 1 or the processor 120 of FIG. 1) may be configured to: identify a folding state of the electronic device through a sensor (e.g., the sensor module 176 of FIG. 1 (e.g., a motion sensor or magnetic sensor)) configured to identify the folding state of the electronic device, identify the direction of the electronic device through a sensor (e.g., the sensor module 176 of FIG. 1 (e.g., a gyro sensor)) configured to identify the direction of the electronic device, identify a grip state through a sensor (e.g., the sensor module 176 of FIG. 1 (e.g., a touch sensor, a pressure sensor, or an illuminance sensor)) configured to identify the grip state, and adjust a sound signal received through a microphone (e.g., the input module 150 of FIG. 1) based on the identified folding state, direction and grip state of the electronic device.

For example, the electronic device may identify the position of the microphone based on the folding state of the electronic device and the direction of the electronic device and identify the position of the hidden microphone through the grip state. According to various embodiments, the electronic device may determine the direction of the sound signal obtained through the microphone based on the obtained position of the microphone and may not use the magnitude and reception time of the sound signal received through the hidden microphone in determining the direction of the sound signal.

According to various example embodiments, an electronic device (e.g., the electronic device 100 of FIG. 1) may comprise: a flexible display (e.g., the display module 160 of FIG. 1), at least one microphone (e.g., the input module 150 of FIG. 1), a sensor (e.g., the sensor module 176 of FIG. 1), a communication module comprising communication circuitry (e.g., the communication module 190 of FIG. 1), and at least one processor (e.g., the processor 120 of FIG. 1) operatively connected with the flexible display, the at least one microphone, the sensor, and the communication module. The at least one processor may be configured to: upon receiving a call signal from an external electronic device through the communication module, identify whether the call signal is a video call signal, based on the call signal being the video call signal, identify a folding state of the electronic device through the sensor, adjust a sound signal received through the at least one microphone based on the folding state, and control the communication module to transmit the adjusted sound signal to the external electronic device.

According to various example embodiments, the at least one processor may be configured to determine a direction of the sound signal based on at least one of a magnitude of the sound signal or a reception time of the sound signal received through each of the at least one microphone.

According to various example embodiments, the at least one processor may be configured to reduce sound signals other than a sound signal received from a front of the electronic device among the received sound signals, as a first level, based on the folding state of the electronic device being a fully folded state or a fully unfolded state.

According to various example embodiments, the at least one processor may be configured to reduce the sound signals other than the sound signal received from the front of the electronic device, as a second level higher than the first level, based on the folding state of the electronic device being a semi-folded state.

According to various example embodiments, the at least one processor may be configured to: reduce the sound signals other than the sound signal received from the front of the electronic device, as the second level, based on a folding angle of the electronic device being a right angle and reduce the sound signals other than the sound signal received from the front of the electronic device, as a third level between the first level and the second level, based on the folding angle based on the folding angle not being the right angle.

According to various example embodiments, the at least one processor may be configured to increase a magnitude of a voice received from the front of the electronic device among the received signals.

According to various example embodiments, the at least one processor may be configured to reduce sound signals other than a sound signal with a largest magnitude among the received sound signals based on the call signal being not the video call signal.

According to various example embodiments, the at least one processor may be configured to adjust the sound signals received through the at least one microphone based on the folding state of the electronic device based on the call signal being changed to the video call signal.

According to various example embodiments, the at least one processor may be configured to adjust the received sound signals further based on a direction of the electronic device or a grip state of a grip on the electronic device.

According to various example embodiments, the electronic device may further comprise a plurality of hinges. The at least one processor may be configured to adjust the received sound signals further based on a position of a folded hinge among the plurality of hinges.

According to various example embodiments, a method for controlling an electronic device (e.g., the electronic device 100 of FIG. 1) may comprise: upon receiving a call signal from an external electronic device through a communication module (e.g., the communication module 190 of FIG. 1), identifying whether the call signal is a video call signal, based on the call signal being the video call signal, identifying a folding state of the electronic device through a sensor (e.g., the sensor module 176 of FIG. 1), adjusting a sound signal received through at least one microphone (e.g., the input module 150 of FIG. 1) based on the folding state, and transmitting the adjusted sound signal to the external electronic device through the communication module.

According to various example embodiments, adjusting the sound signal may include determining a direction of the sound signal based on at least one of a magnitude of the sound signal or a reception time of the sound signal received through each of the at least one microphone.

According to various example embodiments, adjusting the sound signal may include reducing sound signals other than a sound signal received from a front of the electronic device among the received sound signals, as a first level, based on the folding state of the electronic device being a fully folded state or a fully unfolded state.

According to various example embodiments, adjusting the sound signal may reduce the sound signals other than the sound signal received from the front of the electronic device, as a second level higher than the first level, based on the folding state of the electronic device being a semi-folded state.

According to various example embodiments, adjusting the sound signal may reduce the sound signals other than the sound signal received from the front of the electronic device, as the second level, based on a folding angle of the electronic device being a right angle and reduce the sound signals other than the sound signal received from the front of the electronic device, as a third level between the first level and the second level, based on the folding angle based on the folding angle not being the right angle.

According to various example embodiments, adjusting the sound signal may increase a magnitude of a voice received from the front of the electronic device among the received signals.

According to various example embodiments, the method may further comprise reducing sound signals other than a sound signal with a largest magnitude among the received sound signals based on the call signal not being the video call signal.

According to various example embodiments, the method may further comprise adjusting the sound signal received through the at least one microphone based on the folding state of the electronic device based on the call signal being changed to the video call signal.

According to various example embodiments, adjusting the sound signal may adjust the received sound signals further based on a direction of the electronic device or a grip state of a grip on the electronic device.

According to various example embodiments, adjusting the sound signal may adjust the received sound signals further based on a position of a folded hinge among a plurality of hinges of the electronic device.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 100). For example, a processor (e.g., the processor 120) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising,
memory storing instructions:
a flexible display;
at least two microphones;
a sensor;
a communication module comprising communication circuitry; and
at least one processor operatively connected with the memory, the flexible display, the at least two microphones, the sensor, and the communication module,
wherein the instructions, when executed by the at least one processor, individually and/or collectively, cause the electronic device to:

based on receiving a call signal from an external electronic device through the communication module, identify whether the call signal is a video call signal;
based on the call signal being the video call signal, identify a folding state of the electronic device, and adjust a sound signal received through the at least two microphones based on the folding state;
based on the call signal not being the video call signal, adjust the sound signal received through the at least two microphones by reducing sound signals other than a sound signal with a largest magnitude among sound signals received through the at least two microphones;
control the communication module to transmit the adjusted sound signal to the external electronic device; and
determine a direction of the sound signal based on a reception time of the sound signal received through each of the at least two microphones.

2. The electronic device of claim 1, wherein the at least one processor, individually and/or collectively, is configured to determine the direction of the sound signal based on a magnitude of the sound signal.

3. The electronic device of claim 1, wherein the at least one processor, individually and/or collectively, is configured to reduce sound signals other than a sound signal received from a front of the electronic device among the received sound signals, as a first level, based on the folding state of the electronic device being a fully folded state or a fully unfolded state.

4. The electronic device of claim 3, wherein the at least one processor, individually and/or collectively, is configured to reduce the sound signals other than the sound signal received from the front of the electronic device, as a second level higher than the first level, based on the folding state of the electronic device being a semi-folded state.

5. The electronic device of claim 4, wherein the at least one processor, individually and/or collectively, is configured to:
reduce the sound signals other than the sound signal received from the front of the electronic device, as the second level, based on a folding angle of the electronic device being a right angle, and
reduce the sound signals other than the sound signal received from the front of the electronic device, as a third level between the first level and the second level, based on the folding angle based on the folding angle not being the right angle.

6. The electronic device of claim 1, wherein the at least one processor, individually and/or collectively, is configured to increase a magnitude of a voice received from a front of the electronic device among the received signals.

7. The electronic device of claim 1, wherein adjusting the sound signal includes: identify a position of at least one hidden microphone among the at least two microphones based on a user's grip state on the electronic device determined using a signal received from a touch sensor; and
adjusting the sound signal based on the position of the at least one hidden microphone and the folding state.

8. The electronic device of claim 1, wherein the at least one processor, individually and/or collectively, is configured to adjust the sound signals received through the at least two microphones based on the folding state of the electronic device based on the call signal being changed to the video call signal.

9. The electronic device of claim 1, wherein the at least one processor, individually and/or collectively, is configured to adjust the received sound signals further based on the direction of the electronic device or a grip state of a grip on the electronic device.

10. The electronic device of claim 1, further comprising a plurality of hinges,
wherein the at least one processor, individually and/or collectively, is configured to adjust the received sound signals further based on a position of a folded hinge among the plurality of hinges.

11. A method for controlling an electronic device, the method comprising:
based on receiving a call signal from an external electronic device through a communication module, identifying whether the call signal is a video call signal;
based on the call signal being the video call signal, identifying a folding state of the electronic device and adjusting a sound signal received through at least two microphones based on the folding state;
based on the call signal not being the video call signal, adjust the sound signal received through the at least two microphones by reducing sound signals other than a sound signal with a largest magnitude among sound signals received through the at least two microphones; and
transmitting the adjusted sound signal to the external electronic device through the communication module,
wherein adjusting the sound signal includes determining a direction of the sound signal based on a reception time of the sound signal received through each of the at least two microphones.

12. The method of claim 11, wherein adjusting the sound signal includes determining the direction of the sound signal based on a magnitude of the sound signal.

13. The method of claim 11, wherein adjusting the sound signal includes reducing sound signals other than a sound signal received from a front of the electronic device among the received sound signals, as a first level, based on the folding state of the electronic device being a fully folded state or a fully unfolded state.

14. The method of claim 13, wherein adjusting the sound signal reduces the sound signals other than the sound signal received from the front of the electronic device, as a second level higher than the first level, based on the folding state of the electronic device being a semi-folded state.

15. The method of claim 14, wherein adjusting the sound signal comprises:
reducing the sound signals other than the sound signal received from the front of the electronic device, as the second level, based on a folding angle of the electronic device being a right angle, and
reducing the sound signals other than the sound signal received from the front of the electronic device, as a third level between the first level and the second level, based on the folding angle based on the folding angle not being the right angle.

16. The method of claim 11, wherein adjusting the sound signal increases a magnitude of a voice received from a front of the electronic device among the received signals.

17. The method of claim 11, wherein adjusting the sound signal includes: identify a position of at least one hidden microphone among the at least two microphones based on a user's grip state on the electronic device determined using a signal received from a touch sensor; and adjusting the sound signal based on the position of the at least one hidden microphone and the folding state.

18. The method of claim 11, further comprising adjusting the sound signal received through the at least two microphones based on the folding state of the electronic device based on the call signal being changed to the video call signal.

19. The method of claim 11, wherein adjusting the sound signal adjusts the received sound signals further based on the direction of the electronic device or a grip state of a grip on the electronic device.

20. The method of claim 11, wherein adjusting the sound signal adjusts the received sound signals further based on a position of a folding hinge among a plurality of hinges of the electronic device.

* * * * *